United States Patent [19]

Norman et al.

[11] Patent Number: 4,748,588

[45] Date of Patent: May 31, 1988

[54] FAST DATA SYNCHRONIZER

[75] Inventors: Vernon R. Norman; Sidney B. Schrum, Jr.; Charles R. Wicker, all of Cary, N.C.

[73] Assignee: International Business Machines Corp., Armonk, N.Y.

[21] Appl. No.: 810,139

[22] Filed: Dec. 18, 1985

[51] Int. Cl.⁴ .................................. G06F 13/00
[52] U.S. Cl. ................................... 364/900
[58] Field of Search ... 364/200 MS File, 900 MS File

[56] References Cited

U.S. PATENT DOCUMENTS

| | | | |
|---|---|---|---|
| 3,188,569 | 6/1965 | Mahony et al. | 375/108 |
| 4,021,784 | 5/1977 | Kimlinger | 364/200 |
| 4,027,292 | 5/1977 | Okamoto et al. | 364/200 |
| 4,054,747 | 10/1977 | Pachynski | 375/118 |
| 4,056,851 | 11/1977 | Hovagimyan et al. | 364/900 |
| 4,258,418 | 5/1981 | Heath | 364/200 |

OTHER PUBLICATIONS

Patent Abstracts of Japan, vol. 6, No. 151 (E-124) (1029), Aug. 11th, 1982; & JP-A-57 75 046 (Fujitsu K.K.) 11-05-1982.

Primary Examiner—Raulfe B. Zache
Assistant Examiner—A. Mohamed
Attorney, Agent, or Firm—Joscelyn G. Cockburn

[57] ABSTRACT

A circuit arrangement for synchronizing source data from a source system with a clock and/or clocks from a sink system. The circuit arrangement includes a source counter, a buffer, a sink counter and a controller. The source data is placed in consecutive buffer positions under the control of the source counter. The sink counter is made to "follow" the source counter and identifies the location in the buffer whereat output data is to be extracted. The controller monitors the counters and generates control signals representative of the state of the buffer.

13 Claims, 22 Drawing Sheets

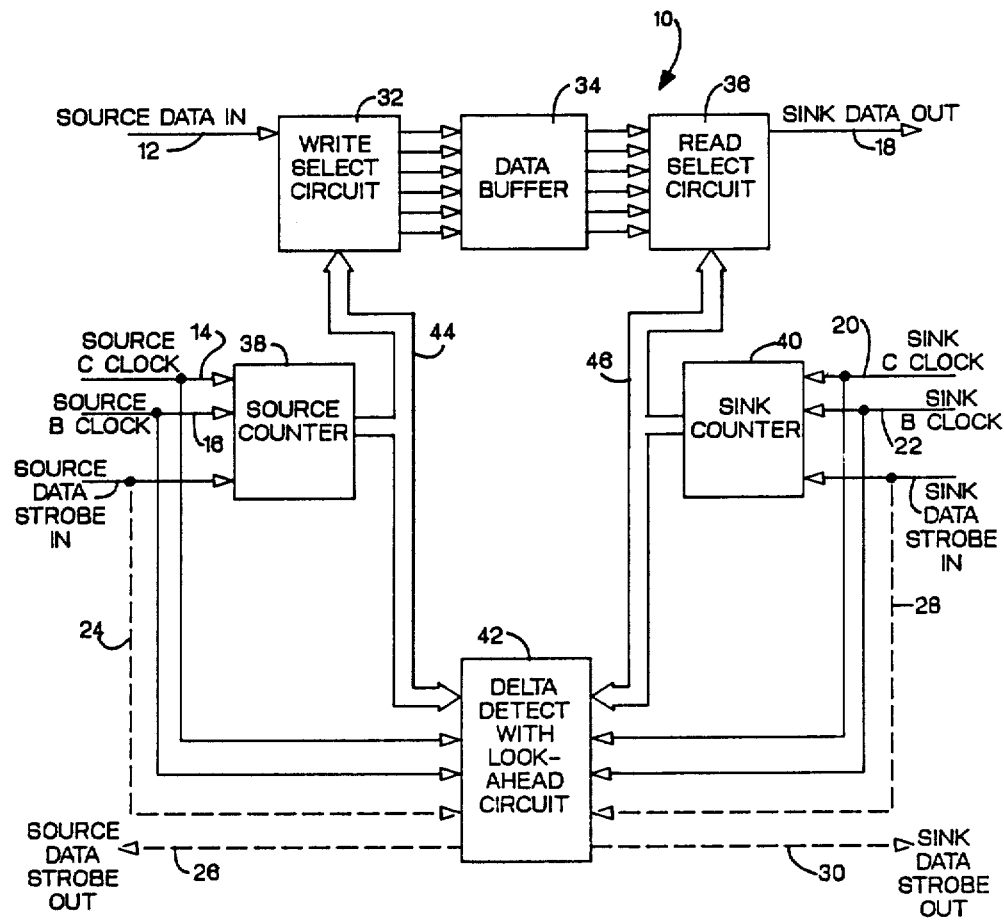

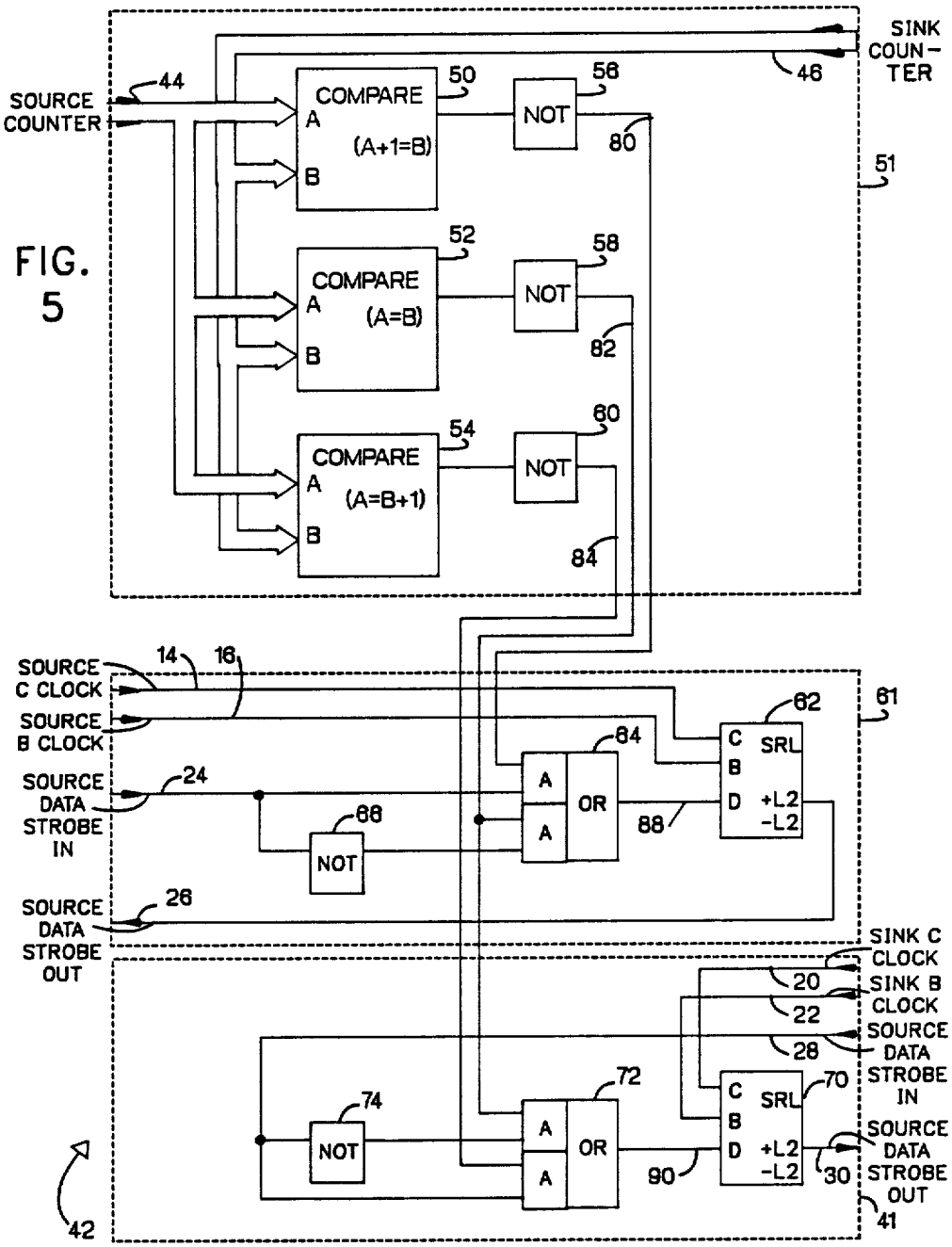

FAST DATA SYNCHRONIZER

BACKGROUND OF THE INVENTION

1. Field of the Invention

The present invention relates to data handling in general and more particularly to a synchronizer which synchronizes data with clock pulses.

2. Prior Art

In designing synchronous digital systems, there are times when it is required to pass data unidirectionally between two groups of logic. Oftentimes, the clocks for the two groups of logic are different. Before the receiving logic can use the data, the data must be resynchronized with the clocks of the receiving logic. A typical or straigntforward solution is to design a set of "handshaking" signals between the two groups of logics. The handshaking signals are used to indicate the arrival and acceptance of data. The typical solution requires multiple clock cycles (source and sink) per synchronized data item. The solution causes a throughput "bottleneck" at the synchronizer. Systems in which a data item can be processed every clock cycle are susceptible to the throughput "bottleneck" error condition.

Another prior art solution to the above problem is set fourth in U.S. Pat. No. 4,119,796. In the patent a digital phase lock loop synchronizes an incoming clock with a local clock. A shift register delays incoming data pulses by the same amount as the incoming clock pulses so that the data pulses are synchronized with the local clock. An output of a counter is used to drive a selector that selects the proper output of the shift register.

Still other prior art solutions are described in U.S. Pat. Nos. 4,065,862 and 4,320,515. Both patents require the use of shift registers through which the data to be synchronized is shifted. Phase lock loops are used to generate internal clocks. The frequencies of the generated clocks are usually higher than the frequencies of the source and/or sink clocks.

SUMMARY OF THE INVENTION

It is therefore an object of the present invention to provide a more efficient data synchronizer than was heretofore been possible.

The data synchronizer functions as a first-in, first-out (FIFO) buffer. Incoming data once written into a buffer position is not shifted to another position within the buffer. Instead, write and read pointers are moved to effect data transfer. A source write counter controls a writing circuitry which writes the incoming data into consecutive buffer positions. Likewise, a sink read counter "follows" the write counter and controls a read circuitry which reads data items from consecutive buffer positions. Preferably, the read and write counters are implemented as ring counters or gray code counters. By utilizing ring counters or gray code counters, glitchless detection of the counter states can be achieved. A delta detection circuitry compares the states of the read and write counters to determine if data to be synchronized exists in the buffer and if empty buffer positions are available for additional data.

In one embodiment of the invention the delta detection circuitry is used to indicate an error condition with the synchronizer.

These and other features and advantages of this invention will be more fully described in the accompanying drawings.

BRIEF DESCRIPTION OF THE DRAWINGS

FIG. 4 is a functional block diagram of the data synchronizer according to the teachings of the present invention.

FIG. 5 shows a block diagram for the Delta Detect with Look-Ahead Circuit Means.

DESCRIPTION OF THE PREFERRED EMBODIMENT

Figure 1:
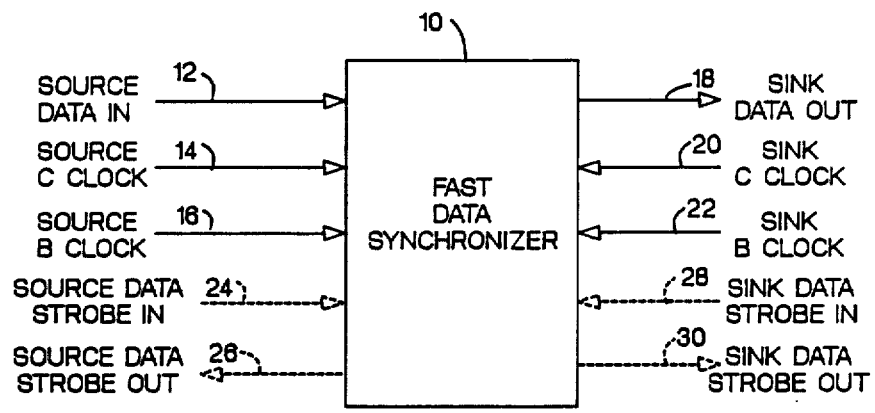
FIG. 1 shows a block diagram of the present invention with important signal lines entering and leaving the synchronizer.

FIG. 1 shows a block diagram of the fast data synchronizer according to the teaching of the present invention. The synchronizer includes a black box (to be described subsequently) identified by numeral 10 and a plurality of input/output control signal lines connected to box 10. For purposes of this invention, the set of circuit (not shown) from which the data original is is referred to as the "Source System" and the set of circuit (not shown) to which the data is eventually transferred is referred to as the "Sink System." The input and output lines on the left side of block 10 (details to be given subsequently) are connected to the source system. The arrowheads on each line signify the direction of data flow. The signals on these lines are all synchronous with the source system clocks.

Likewise, the input and output lines on the right side of block 10 are connected to a sink system (not shown). The signals on these lines are also synchronous with the sink system clocking. Data to be synchronized arrives on line 12. The data is delayed and resynchronized in the fast data synchronizer 10. The data then leaves the synchronizer over line 18. The source system clocks C and B are provided to the synchronizer on lines 14 and 16, respectively. In particular, source C clock appears on line 14 while source B clock appears on line 16. Source C clock clocks the data into the L1 stages of a set of shift register latches (to be described subsequently). The latches are provided in the synchronizer. Likewise, the source B clock clocks data from the L1 stages into the L2 stages of the shift register latches (SRLs).

Still referring to FIG. 1, the input and output lines on the right side of block 10 are connected to the sink system (not shown). These signals are also synchronous with the sink system clocks.

The sink system clocks, which may be different in phase and frequency from the source system clocks, are provided to the synchronizer on lines 20 and 22, respectively. Sink C clock, on line 20, clocks data into the L1 stages of the SRLS (to be described subsequently). Sink B clock, on conductor 22, clocks data from the L1 stages to the L2 stages of the SRLs. Signals on lines 24, 26, 28, and 30 are data strobe signals. These signals are control signals and are used to indicate the transfer of data during a particular clock cycle. As will be explained subsequently, there are some options available as to how the synchronizer is configured and used. Depending on the option selected, not all of the signals on lines 24, 26, 28 and 30 are needed for a particular configuration. To reflect the selectivity of use and/or configuration, the signals are shown with dotted lines.

For purposes of discussion, it is assumed that the clocks (source and sink) are free-running. This means that the clocks change states at a regular rate. However, the transfer of data from the source system to the sink system is not necessarily regular. Stated another way, data transfer does not always occur on every clock cycle. The data strobe signals (24, 26, 28 and 30) are therefore activated in order to indicate a data transfer into and/or out of the synchronizer. To this end, the Source Data Strobe In signal on line 24 is activated to indicate that the data on the Source Data In line 12 is good. Since the data is good, it should be accepted and latched up by the synchronizer. The Source Data Strobe Out Signal on conductor 26 is used to indicate that the synchronizer is ready to accept new data on Source Data In line 12. The Sink Data Strobe In signal on conductor 28 is activated in order to indicate that the data available on the Sink Data Out line 18 has been accepted and that on the next clock cycle a new group of data items can be placed on Sink Data Outline 18. Sink Data Strobe Out signal on conductor 30 is activated by the synchronizer in order to indicate that a new data item has been placed on the Sink Data Out 18.

Figure 2:
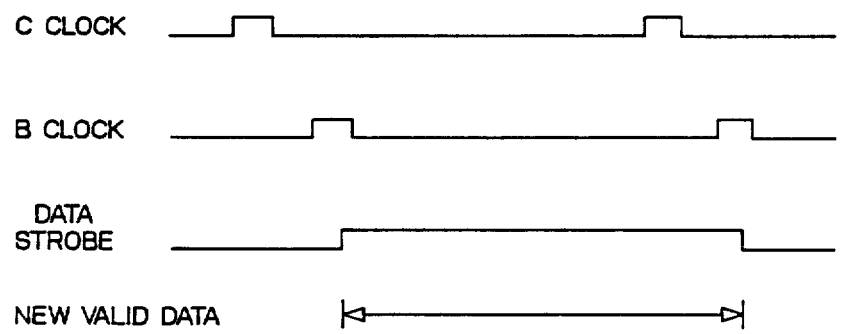
FIG. 2 is a timing chart showing relationships between the C clock, B clock, data strobe and data.

FIG. 2 is a timing chart showing the time relationship between the C clock, B clock, data strobe, and new valid data. The chart is meant to show the relationship between those signals within a clocking system (source or sink) but not between clocking systems, since there is no required relationship between the signals in the source clocking system and the sink clocking system. The timing (relative to the C and B clocks) of the data strobe in and out signals is the same and is shown by the chart signal labeled "Data Strobe." Whenever a data strobe signal is activated, a new data item must exist, during the same clock cycle, on the appropriate data in/data out line. The timing of the presentation of the data item is shown by the chart signal labeled new valid data.

Before describing the details of the fast data synchronizer it should be noted that the synchronizer is designed in accordance with the level sensitive scan design (LSSD) rules. These rules, which are well known in the testing art, were first proposed by the assignee of the present invention and are now becoming the standard for testing logic within the industry. In this regard, the invention is implemented with memory elements (latches) which are LSSD testable shift register latches (SRLs). However, it should be noted that the invention may be implemented with logic circuitry that is not LSSD testable. For example, the invention may also be implemented using D-type edge triggered flip flops and a single phase clocking system.

In order to demonstrate the LSSD testability of this invention, the synchronizer is shown implemented using D-type shift register latches (SRLs) as memory elements. A clocking system typical of that used with SRLs is assumed and is shown in FIG. 2. Usually, such a clocking system utilizes two non-overlapping clock signals. The use of this type of clocking system with LSSD testable devices are well known in the prior art and details will not be given here. Suffice it to say that the D-type SRL contains two stages, each consisting of a "polarity-hold" (also referred to as a "phase hold" or transparent) D-type latch. The first stage is referred to as the "L1" stage and the second is referred to as the L2 stage.

The output of the L1 stage is fed to the input of the L2 stage. The inputs to the L1 stage are an "A clock", a "C clock", "data input", and "scan input". The A clock and the scan input are used only during testing, and serve no function during normal operation. Therefore, in order to avoid confusion, the A clock and scan input signals will not be shown in any of the figures (to be described hereinafter). The C clock input to the "SRL" latch blocks is designated with a "C." The data input to the SRL latch blocks is designated with a "D". The C clock, when active, causes the L1 stage to be transparent relative to the data input. That is, the data that appears on the data input also appears on the output of the L1 stage. If the C clock is inactive, the data that was present on the data input at the time that the C clock was deactivated is held in the L1 stage. The "B clock" provides clocking for the L2 stage. The B clock functions the same for the L2 stage as the C clock does for the L1 stage. The data that is clocked into the L2 stage, by the B clock, is the output of the L1 stage. The positive output of the L2 stage is called the "+L2" output and is designated by a "3" on the SRL blocks. Likewise, the negative output is called "−L2" output and it is designated by a "4" on the SRL blocks. The notations described in this paragraph are well known LSSD notations. Therefore, they will not be referred to again throughout the remaining description of the present invention.

The basic fast data synchronizer 10, (FIG. 1) may be configured in various ways in order to produce different types or varieties of synchronizers. In terms of the inputs and outputs, the manifestation of the options occurs in the presence or absence of the data strobe signals and the ways in which these signals are interconnected. The basic internal circuitry for the fast data synchronizer is the same for all of the options. However, for certain of the options some of the circuitry may not be used and therefore may be omitted. There are two areas where options may be exercised in order to produce a particular synchronizer implementation. The first option area concerns controlling the flow of data through the synchronizer. In order for the synchronizer to synchronize data, without error, the rate at which data is clocked into the synchronizer must be equal to the rate at which data is clocked out of the synchronizer. However, there are three ways in which the flow of data into and out of the synchronizer can be controlled or paced. These result in three control schemes and three basic types or varieties of synchronizers. The three types are called source control, sink control and source and sink control. In order to simplify the description common numerals are used to identify identical elements and/or signal lines in the various views of the drawing.

Figure 3A:
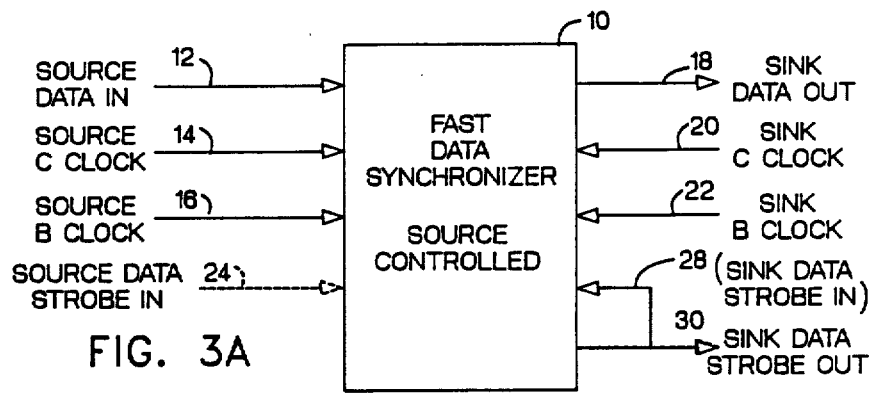
FIG. 3A is a block diagram of a source control synchronizer.

FIG. 3A shows a block diagram for a source control fast data synchronizer. The flow of data through the source control synchronizer is paced by the source system (not shown). When the Source System has a data item to be transferred to the Sink System (not shown), the Source System places the data item on Source Data In line 12 and activates the Source Data Strobe In signal on line 24. Once the synchronizer has clocked in the data item and synchronizes it, the data item is placed on Sink Data Out line 18 and the Sink Data Strobe Out line 30 is activated. For this type of synchronizer, it should be noted that the Sink Data Strobe Out line 30 is connected into the sink data strobe in line 28. Therefore, when the Sink Data Strobe Out signal 30 is activated, the Sink Data Strobe In signal 28 is also activated thereby indicating that the presented data is to be accepted at the end of that clock cycle during which the sink strobe was activated. As a result, the synchronizer will only present a particular data item on the Sink Data Outline for a single clock cycle.

The sink system (not shown) must also be ready to latch-up the arriving data, since the sink system does not control the presentation of the data. In general, the operation of the synchronizer is such that the synchronizer attempts to empty its internal data buffers of the synchronized data by forcing it into the sink system. Since, for this type of synchronizer, it is assumed that the source system can clock data into the synchronizer on any clock cycle (FIG. 1), the Source Data Strobe out signal on line 26 is not used. Therefore, this signal and the associated internal circuitry (to be described subsequently) used to develop this signal are not present.

Figure 3B:
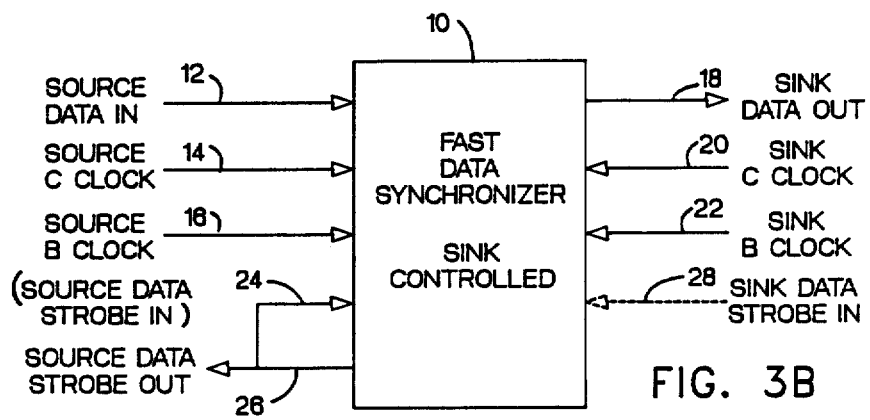
FIG. 3B is a block diagram of a sink control synchronizer.

FIG. 3B shows a block diagram for a sink control fast data synchronizer. The flow of data through the sink control synchronizer is paced by the sink system. In general, the operation of this synchronizer is such that the synchronizer attempts to keep its internal buffers full with data from the source system so that synchronized data will always be available on demand by the sink system. The synchronizer also makes available good data on the Sink Data Out line 18. When the sink system desires to transfer data, the sink system activates the Sink Data Strobe In signal on new line 28 and at the end of that clock cycle latches up the data on the Sink Data Out line 18. In response, the synchronizer does two things on the next clock cycle. A new, good data item is placed on the Sink Data Outline 18 and one internal buffer position is freed up for more data.

The fact that a buffer position is emptied also results in the synchronizer forcing the Source Data Strobe Out line 26 active. Because the Source Data Strobe Out signal on line 26 is tied to the Source Data Strobe In signal on line 24 the synchronizer immediately places the data on Source Data In line 12 into the empty buffer position. Therefore, for the sink control synchronizer, the sink system demands data on any clock cycle. The source system makes a good data item available on Source Data In line 12. Every time the source system detects the fact that the synchronizer has activated the Source Data Strobe Out signal 26, the source system must present a new good data item on Source Data In line 12, since previous good data item has now been latchedup in the synchronizer. With this type of synchronizer, the Sink Data Strobe Out signal (FIG. 1) is not used because it is assumed that the sink system can demand data on any clock cycle without limit. Therefore, this signal and the associated internal circuitry (to be described hereinafter) used to develop this signal are not present.

In summary, it should be noted that in a source control synchronizer, the sink system is a slave system, in terms of data flow, and the sink system has no control over the transfer of data. Likewise, in a sink controlled synchronizer the source system is a slave and the source system has no control over the transfer of data.

Figure 3C:
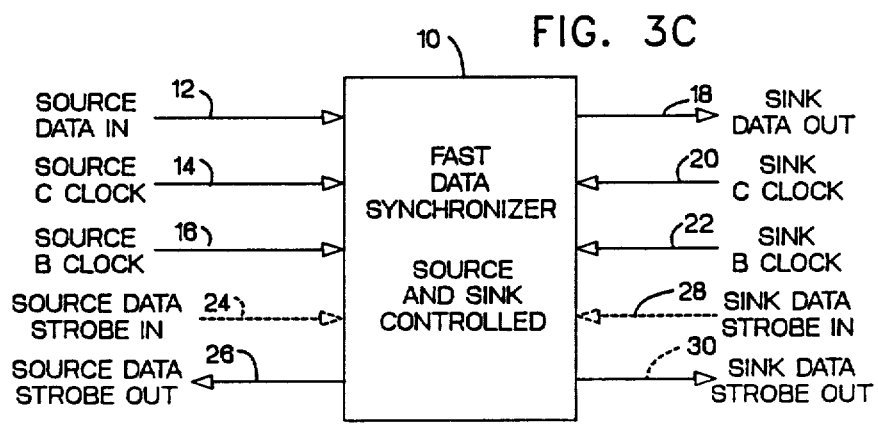
FIG. 3C is a block diagram of a source and sink control synchronizer.

FIG. 3C shows a block diagram for a source and a sink control synchronizer. The flow of data in the source and sink control synchronizer is paced by both the source and the sink systems respectively. For this type of synchronizer, the source system can force data into the synchronizer on any clock cycle by activating the Source Data Strobe In line 24. Likewise, the sink system can demand data at any time by activating the Sink Data Strobe In line 28. In addition, the state of the internal data buffers is made known to both the source and sink systems. As will be explained subsequently, this is done by observing the Source Data Strobe Out signal 26. The source system is able to determine if an empty buffer position exists. Likewise, the sink system is able to determine if there is any data available in the synchronizer by observing the state of the Sink Data Strobe Out line 30.

Still referring to FIG. 3C, the source and the sink control synchronizer can be used in one of two ways. In a first way, the source system forces data into the synchronizer only when data is available and when empty buffer position exists within the synchronizer as indicated by an active Source Data Strobe Out signal on line 26. The sink system demands data only if data is needed and good synchronized data exists within the synchronizer, as indicated by an active sink data strobe out signal on line 30. As will be explained subsequently, the signals on line 26 and line 30, respectively, are developed within the fast data synchronizer. Thus, it can be seen that data movement through the synchronizer is controlled by both its availability at the source system and by the need for data at the sink system.

A second way in which the source and sink control synchronizer can be used is as an elastic buffer. Use of this synchronizer as an elastic buffer is particularly useful in systems where it is known that over the long term, the rate of data arrival and data exit is exactly the same. The source system forces data into the synchronizer whenever it is made available, without regard to the state of the Source Data Strobe Out signal on line 26. The sink system demands data as it is needed without regard to the state of the Sink Data Strobe Out signal on conductor 30. The Source and Sink Data Strobe Out signals are used to indicate the occurrence of an error within the synchronizer. That is, if a source system tries to force data into the synchronizer when the Source Data Strobe Out line 26 is inactive, then a buffer overrun has occurred and data is lost. Likewise, if the sink system tries to demand data from the synchronizer when the sink data strobe out signal 30 is inactive, then a buffer overrun has occurred and data is lost. Thus, it can be seen that the Source and Sink Data Strobe Out signals are "Not Error" signals. That is, if either ever goes inactive during a data transfer, then an error has occurred. A detailed description of the fast data synchronizer as a elastic buffer will be described hereinafter in relationship with FIGS. 9A–9I.

In addition to the above areas described, there is one other option area available to a user. This option can be applied to each of the three synchronizers shown in FIGS. 3A–3C. Up to this point in the description it has been assumed that the transfer of data into/out of the synchronizer does not occur on every clock cycle. Therefore, Data Strobe In lines are required in order to signal the transfer of data on a particular clock cycle. However, there are systems where data is always transferred with each clock cycle. This is common in communication systems, where a data rate clock is provided with a digital data stream. For this type of systems the Data In Strobes could be held active all of the time, in order to signal to the synchronizer that data is being transferred every clock cycle. However, the Data Strobe In signals are not needed and these signals along with the circuitry (internal to the synchronizer) that freezes the operation of the synchronizer between data transfer may be omitted.

It should be noted that this does not change the way the synchronizer works nor does it change the meaning of any of the other synchronizer input or output signals. For example, in the source control synchronizer (FIG. 3A) if the source system (not shown) is such that data is forced into the synchronizer every source clock cycle, then the Source Data Strobe In signal 24 and associated circuitry (to be described subsequently) can be eliminated. Likewise, for the sink control synchronizer (FIG. 3B) if the sink system is such that data is demanded every source clock cycle, then the Sink Data Strobe In signal 28 and associated circuitry can be eliminated. Finally, for the source and sink control synchronizer (FIG. 3C) if either the source or sink system is of this type then the corresponding Data Strobe In signals and associated circuitry can be eliminated.

FIG. 4 shows a functional block diagram of the data synchronizer according to the teachings of the present invention. The data synchronizer includes a data buffer identified by numeral 34. The data buffer contains a number of buffer positions where data is held stationary during synchronization. The output from each stage of the buffer is fed over an appropriate conductor to read select circuit means 36. The output from read select circuit means 36 is the Sink Data Out signal which is provided on conductor 18. Similarly, the outputs from write select circuit means 32 are coupled by appropriate conductors to each position in data buffer 34. The input data signal to write select circuit means 32 is supplied on conductor 12. The signal is labeled "Source Data In" and carries the data to be synchronized. Source counter means 38 is coupled by bus 44 to write select means 32 and delta detect look-ahead circuit means 42. Similarly, sink counter means 40 is coupled over bus 46 to the read select circuit means 36 and the Delta Detect with Look-Ahead Circuit Means 42. Source C Clock and Source B Clock are fed into the source counter means 38 and Delta Detect with Look-Ahead Circuit Means 42. The Source Data Strobe In signal is supplied on conductor 24 to source counter means 38 and Delta Detect with Look-Ahead Circuit Means 42. Source data strobe out signal is outputted from the Delta Detect with Look-Ahead Circuit Means 42 on conductor or line 26. Likewise, Sink C Clock and Sink B Clock are supplied on conductor 20 and 22, respectively, to sink counter means 40. Sink Data Strobe In signal is supplied on conductor 28 to sink counter means 40 and Delta Detect with Look-Ahead Circuit Means 42. Sink Data Strobe Out signal is outputted on conductor 30.

Still referring to FIG. 4, both the source counter means 38 and the sink counter means 40 are count up only counters. The number of counting states is normally equal to the number of buffer positions in the data buffer 34. The source counter means 38 is advanced on any clock cycle for which the Source Data Strobe In signal on line 24 is made active. Likewise, the sink counter means is advanced in response to the activation of the Sink Data Strobe In signal on line 28. The source counter outputs 44 are connected to both the write select circuit means 32 and the Delta Detect with Look-Ahead Circuit Means 42. The sink counter outputs 46 are connected to the read select circuitry 36 and the Delta Detect with Look-Ahead Circuit Means 42. The write select circuit means 32 operates so that when the Source Data Strobe in signal on line 24 is activated, the data on the Source Data In line 12 is written into the buffer position pointed to by the source counter 38. The read select circuit means 36 operates so that the contents of the data buffer position pointed to by the sink counter means is selected and outputted on the Sink Data Out line 18.

The function of the Delta Detect with look-ahead circuit means 42 is to determine the state of the data buffer. It compares the state of the source counter means 38 and the state of sink counter means 40 to see if the buffer is full or empty. If the data buffer 34 is not full, then the data detect with look-ahead circuit means 42 activates the Source Data Strobe Out line 26 in order to signal the source system (not shown) that empty buffer positions exist in the data buffer 34. If the data buffer 34 is not empty, then the Delta Detect with Look-Ahead Circuit Means 42 activates the Sink Data Strobe Out line 30 in order to signal to the sink system that good synchronized data exists in data buffer 34. In order for the Delta Detect with Look-Ahead Circuit Means to compare the source and sink counter outputs without error, the source and sink counters must be implemented so that the compare can be performed with combinatorial logic whose output is free from "glitches" or spikes. if the source and sink counters are implemented as either ring counters or as gray code counters, then the combinatorial compare can be performed properly.

In addition to the compare function, the delta circuitry 42 includes, as part of its function, a key feature called "Look-Ahead." This feature is a necessary function for the proper operation of the synchronizer. Look-ahead operates such that in performing the compare between the source and sink counters (in order to develop the Data Strobe Out signals on conductors 30 and 26, FIG. 4). The Delta Detect with Look-Ahead Circuit Means under certain conditions compares the next state (rather than the present state) of the counters. Stated another way, look-ahead refers to anticipating and looking ahead to the next counter state in performing a compare operation, rather than using the present counter state. The conditions for invoking look-ahead are as follows:

If the Source Data Strobe In signal on line 24 is active during a particular (source) clock cycle, then only the next state of the source counter 38 is considered in developing the compare for the Source Data Strobe Out line 26 only. Likewise, if the Sink Data Strobe In signal on line 28 is active during a particular (sink) clock cycle, then only the next state of the sink counter 40 is considered in developing the compare for the Sink Data Strobe Out line 30 only. That is, if a particular counter is to be updated at the end of the present clock cycle (as indicated by an active data in strobe), then look-ahead is used in the delta detect for that counter in order to develop the corresponding Data Strobe Out signal. The look-ahead function is required because there is a one clock cycle delay between the time that the delta detect produces a Data Strobe Out signal and the time that the corresponding counter is updated, for configuration where the data strobe output is fed back into the Data Strobe In signal.

The general operation of the data synchronizer can be explained in relationship with FIG. 4. Incoming data arriving on the Source Data In line 12 is placed in consecutive buffer positions, under the control of the source counter means 38 via the write select circuit means 32. Data once written into a buffer position remains there until it is overwritten by new, good data. The sink counter means 40 "follows" the source counter means 38 and reads out the stationary data that has been previously written by the source counter means 38. The Delta Detect with Look-Ahead Circuit Means 42 provides feedback as to the full/empty status of the data buffer so that no data is lost in the synchronizer during the synchronization process.

The action of the synchronizer can be understood in more detail by considering a specific hypothetical example. For purposes of discussion it should be assumed that the synchronizer in FIG. 4 is configured as a source control synchronizer (FIG. 3A), that is, the Sink Data Strobe Out line 30 (in FIG. 4) is connected to the Sink Data Strobe In line 28. The Source Data Strobe Out line 26 is not used and the Source Data Strobe In line 24 is controlled by the source system (not shown). Furthermore, assume that the data buffer 34 contains four buffer positions each capable of storing a single data bit. Therefore, the number of source and sink counter stages is also equal to four. The names of the data buffer positions and the counter states are 0, 1, 2 and 3. Initially, imagine that both the source and sink counters are in state 0. At this point the data buffer is empty, and the delta detect circuitry 42 indicates this by holding the sink Data Strobe Out signal on line 30 inactive. The data buffer is known to be emptied because the source and sink counters are both in the same state.

The synchronizer will remain quiescent at this point, until the source system forces data into the synchronizer by activating the Source Data Strobe In signal 24. Imagine now that the source system activates the Data Strobe In signal 24 for one clock cycle and at the same time places a new good data item on the Source Data In line 12. At the end of the source clock cycle in which the strobe was activated, the data on the Source Data In line 24 is written into buffer position 0 and the source counter 38 is advanced to state "1." It should be noted that at this point the contents of data buffer position "0" (that is, the newly written data bit) is driven out onto the Sink Data Outline 18, since the sink counter still points to the data buffer position 0. However, the sink system cannot do anything with this data until the presence of the data is made known by activating the Sink Data Strobe Out line 30. At this point the combinatorial logic within the delta detect circuitry 42 detects that the source and sink counters are not equal thereby indicating that good data exists in the data buffer 34. The output of the combinatorial logic (to be described hereinafter) is fed into a D-type SRL (within the delta detect circuitry) in order to synchronize that output with the sink system clock. The output of this D-type SRL is outputted (from the delta detect circuitry) as Sink Data Strobe Out line 30. At the next sink clock cycle after the source counter is updated the Sink Data Strobe Out line 30 is activated, thereby indicating to the sink system that good data exists on the Sink Data Outline 18.

It should be noted that at this time source counter means 38 is at state 1, the sink counter is at state 0 and the Sink Data Strobe Out line 30 is active. At the end of the sink clock cycle, since the Sink Data Strobe Out line 30 is connected to the Sink Data Strobe In line 28, the sink counter will be advanced by "1" to state "1." However, during this clock cycle the delta detect circuitry is performing another compare to see if more data exists in the data buffer (the compare is done every clock cycle). If it were not for look-ahead (to be described in detail hereinafter), the delta detect circuitry at this time would compare the source counter at state 1 and the sink counter at state 0 and at the end of the present sink clock cycle activate the sink Data Strobe Out signal 30 again. In other words, without look-ahead in the delta detect circuitry 42, two sink data strobes would be produced for a single data item. However, at this time the look-ahead function is invoked because the Sink Data Strobe In line 28 is active. The result is that the source counter at state "1" is compared to the next state of the sink counter (the next state being 1). The result of this compare is that the two counters are at the same state so there is no more data in the data buffer.

It should be noted that if the source system had written two data items into the data buffer on consecutive clock cycles then the compare would indicate at this point that there is more data in the data buffer, since the compare would be between the source counter at state 2 and the sink counter at the next-state 1. Expressing the look-ahead situation another way, there are at least two sink system clock cycles between the time that the combinatorial compare logic indicates that there is data in the buffer and the time that the sink counter is actually updated. Therefore, because of this lag between detection and counter update look-ahead must be employed in order to prevent the delta detect circuitry from erroneously indicating the existence of an extra data item. Detailed block diagram circuitry for each of the functional blocks, in FIG. 4, will now be described.

FIG. 5 shows a detailed block diagram circuit for the delta detect circuit means 42 (FIG. 4). The previously described look-ahead function is not shown in FIG. 5 but it will be shown subsequently. The delta detect circuitry 42 includes a compare section identified by numeral 51, section 61 generates and provides the Source Data Strobe Out signal on conductor 26 and section 41 generates and provides the sink Data Strobe Out signal on conductor 30. The compare function, in the delta detect means 42, takes place within three combinational logic functional blocks labeled 50, 52 and 54. The input to these blocks is the output from source counter means 38 on bus 44 and sink counter means 40 on bus 46. The output from each block is fed through NOT-blocks 56, 58 and 60, respectively, into sections 61 and 41. Compare block 52 produces a logical output signal for the compare function "source counter (A)=-sink counter (B)." This output signal is used as the non-look-ahead compare for both the Source and the Sink Data Strobe Out signals. Compare block 50 produces the logic function "source counter (A+1) or (source counter next-state)=sink counter B." This block serves as a look-ahead compare for the Source Data Strobe Out signal 26. Similarly, compare block 54 produces the logic function "source counter (A)=sink counter (B+1) or (sink counter next−state)." This block serves as a look-ahead compare for the Sink Data Strobe Out signal 30.

Logic blocks 56, 58 and 60 invert the compare block's output, since the presence of data in the data buffer is indicated by the counters not being equal. That is, when the resulting signals on conductors 80, 82 and 84 are active, there is synchronized data in the data buffer. Note that the source and sink counters and the compare functions are implemented such that the signals on lines 80, 82 and 84 are "glitchless." That is, once a signal transition occurs from one state to another, it will remain in the resulting state for at least one clock cycle.

Still referring to FIG. 5, shift register latch 62, NOT gate 66 and AND/OR gate 64 are used specifically to develop the Source Data Strobe Out signal 26. AND-OR block 64 is used to select either a normal compare or a look-ahead compare based on the state of Source Data Strobe In line 24. Not block 66 is used to invert the Source Data Strobe In line 24 so that a normal compare (A=B) is selected when that signal is inactive. D-type SRL latch 62 is used to synchronize the compare result to the source clocking system. Because both source and sink counter outputs feed into the compare circuitry, the compare outputs are not synchronized with either of the source or sink clocking systems. That is, the compare block outputs may have transition in the middle of either a source or sink clock cycle. Therefore, even though the compare results signal at conductor 88 is glitch-free, synchronizing block 62 is still required. The Source Data Strobe Out signal 26 is driven directly off the positive output of SRL 62.

In a like manner, SRL 70, AND/OR circuit block 72 and NOT block 74 are used to develop the Sink Data Strobe Out signal 30. AND-OR block 72 selects either a normal or look-ahead compare, based on the state of the Sink Data Strobing In signal 28. D-type SRL 70 is used to synchronize the resulting signal on conductor 90 to the sink clocking system in order to produce the Sink Data Strobe Out signal 30.

Still referring to FIG. 5, it should be noted that if the Source Data Strobe Out signal is not required for a particular synchronizer implementation (such as the previously described source control synchronizer) then the logic blocks that are used to develop that signal may be omitted. For example, the blocks that may be omitted are 50, 56, 62, 64 and 66. Likewise, if the Sink Data Strobe Out signal 30 is not required for a particular synchronizer implementation (such as a sink control synchronizer), then logic blocks 54, 60, 70, 72 and 74 may be omitted.

Figure 6A:
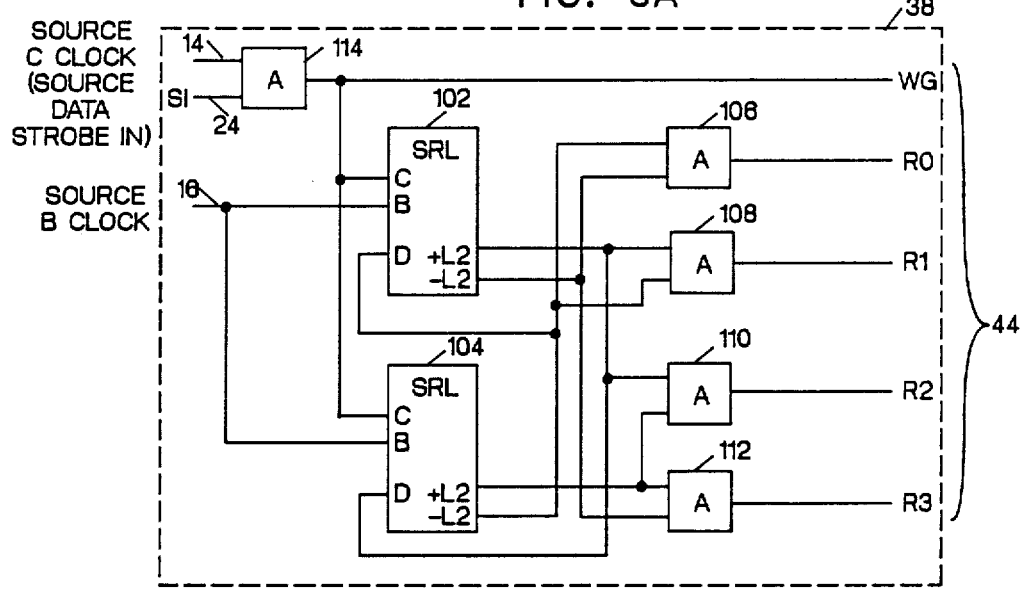
FIG. 6A shows a block diagram for a four-bit source counter.

FIG. 6A shows a block diagram for 4-bit source counter means 38. The implementation is a 4-bit counter for a source control synchronizer. SRLs 102 and 104 form a 4-state gray code counter. AND gates 106, 108, 110 and 112 are coupled through appropriate conductors to the SRLs and are used to decode the four states of the counter. AND gate 114 is used to gate the Source C Clock so that the counter counts only when the Source Data Strobe In signal on line 24 is active. The decoded outputs of the source counter 38 are outputted as signals R0, R1, R2, and R3. Also, the write gate output from AND gate 114 is labeled "WG." These signals are identified by numeral 44 and are supplied to the write select circuit 32 (FIGS. 4 and 6C).

Figure 6B:
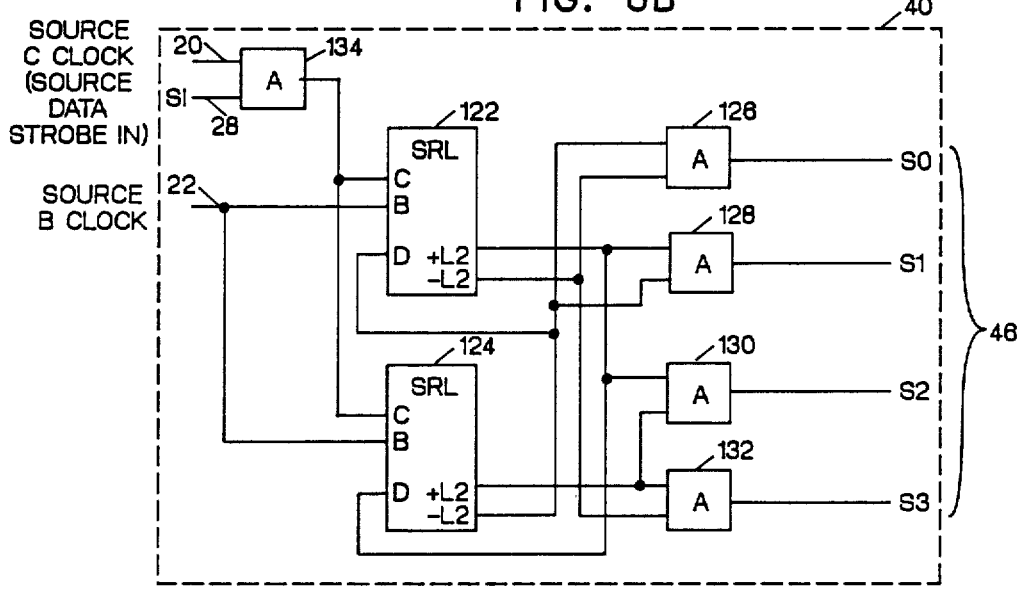
FIG. 6B shows a block diagram for a four-bit sink counter.

FIG. 6B shows sink counter means 40 which is implemented as the gray code counter previously described in accordance with FIG. 6A. Since the details of the sink counter means 40 are substantially the same as source counter means 38, the description given relative to source counter means 38 is equally applicable and as such will not be repeated. Suffice it to say that the difference between the description of FIG. 6A and FIG. 6B is that the counter in FIG. 6B is clocked with the sink clocking system while the counter in FIG. 6A is clocked with the source clocking system. Also, output signals S0, S1, S2 and S3 are labeled 46 and are fed into Read Select Circuit Means 36 (FIG. 6C).

Figure 6C:
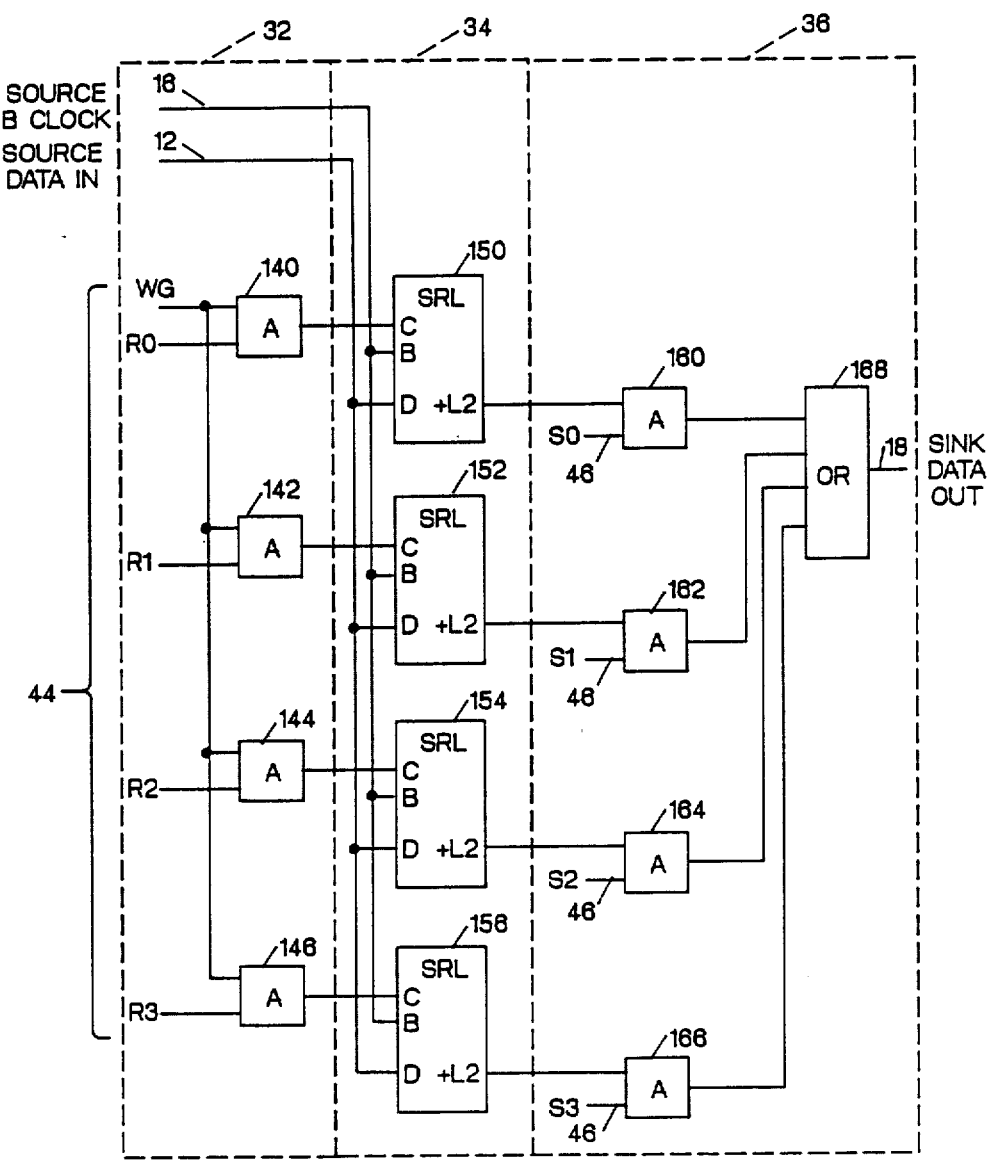
FIG. 6C shows a block diagram for a four-bit write select circuitry, a data buffer and a read select circuitry.

FIG. 6C shows a block diagram for the write select circuit means 32, the data buffer 34, and the read select circuit means 36. The write select circuit means 32 includes AND gates 140, 142, 144 and 146. The data buffer 34 include SRLs 150, 152, 154 and 156. The read select circuitry 36 includes AND gates 160, 162, 164 and 166 and OR gate 168. The signals labeled 44 are supplied from the source counter means 38 (FIG. 6A). Similarly, the signals labeled S0–S3 (on conductor 46) are supplied from Sink Counter Means 40 (FIG. 6B).

Figure 6D:
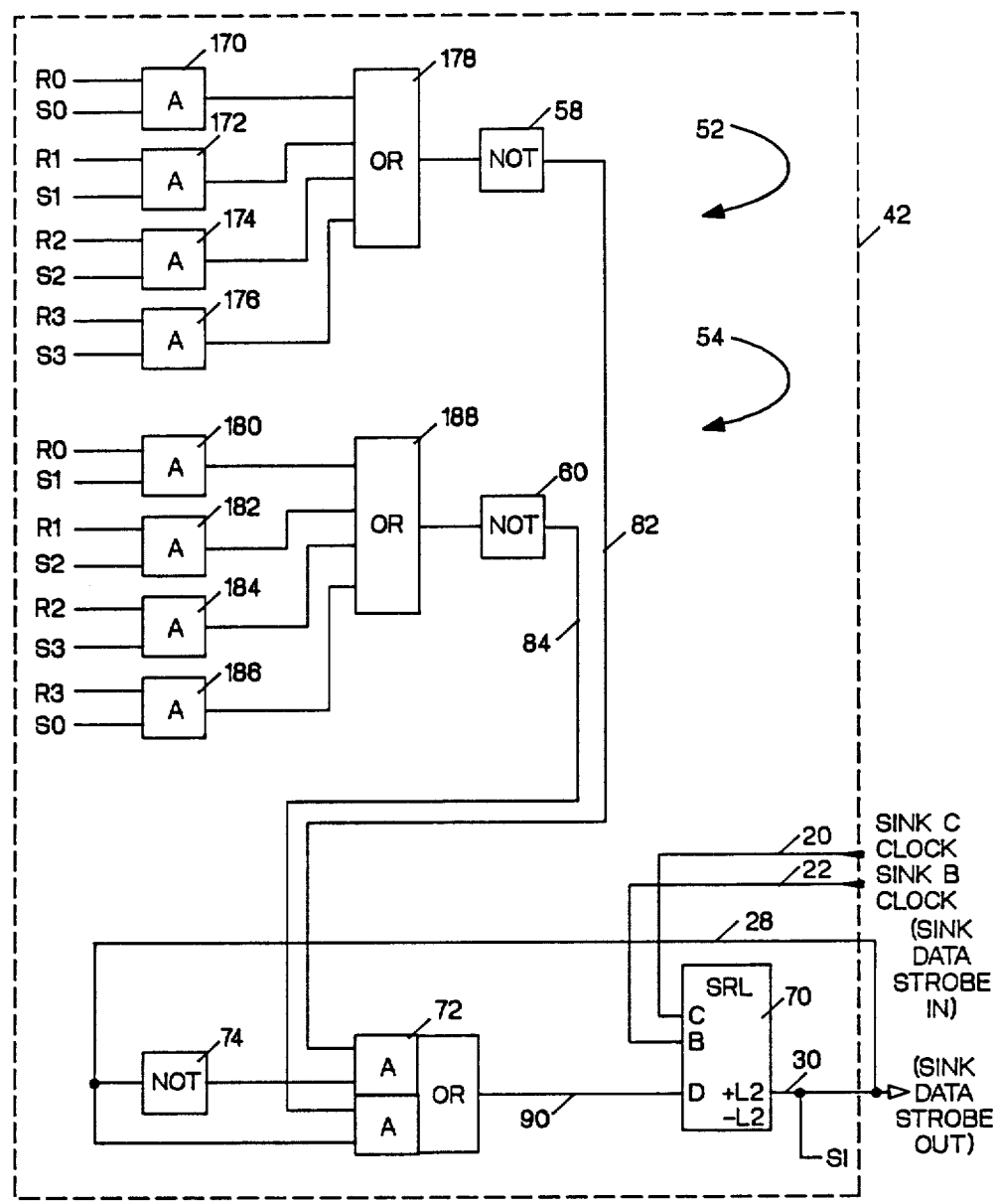
FIG. 6D shows a block diagram for the delta detect circuitry with look-ahead.

FIG. 6D shows delta detect circuit means 42 (FIG. 4) with the look-ahead feature. The function "source counter=sink counter" is generated by AND gates 170, 172, 174, 176 and OR gate 178. The function "source counter=sink counter next state" is generated by AND gates 180, 182, 184, 186 and OR gate 188. AND-OR gate 72 under the control of Sink Data Strobe In signal on line 28, through NOT gate 74, provides the selection between the two compare functions. SRL 70 synchronizes the compare output on conductor 90 to the sink clocking system identified as Sink C Clock and Sink B Clock, respectively.

Figure 7A:
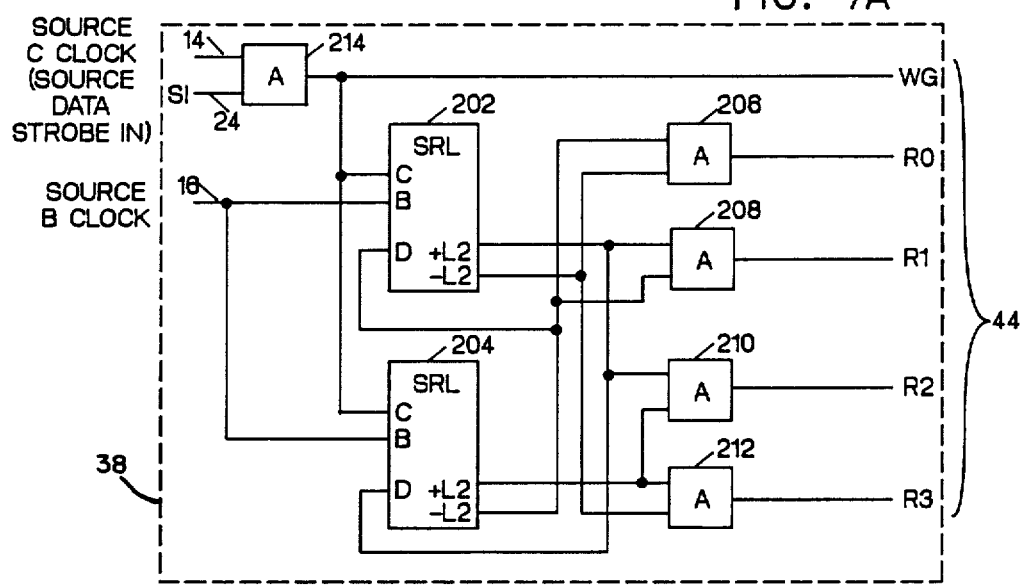
FIGS. 7A-7D show detail block diagrams for a sink control synchronizer.
Figure 7B:
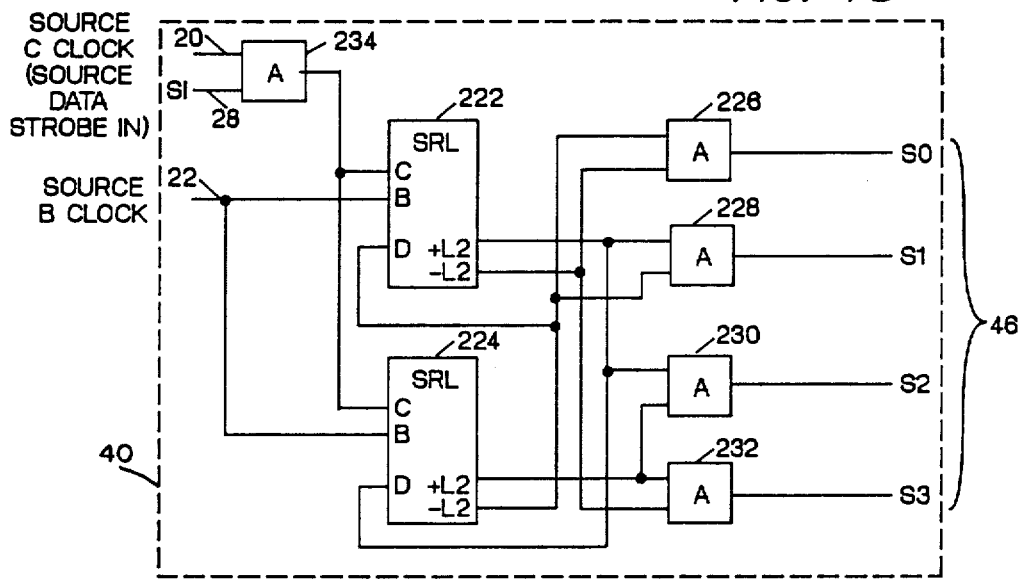

FIGS. 7A-7D show a fast data synchronizer which is substantially the same as the one shown in FIGS. 6A-6D, except that the synchronizer shown in FIGS. 7A-7D is configured as a sink control synchronizer. In FIGS. 6 and 7 corresponding views in the drawings perform corresponding function. Thus, FIGS. 6A and 7A show the detail circuitry in block diagram form for the source counter means 38 (FIG. 4). Similarly, FIGS. 6B and 7B shows in block diagram form the circuit arrangement for sink counter means 40 (FIG. 4) and so on.

FIG. 7A shows a detail block diagram for the source counter means 38. The source counter means 38 includes two SRL 202 and 204. The outputs from the SRLs are fed into AND blocks 206–212. The output from each AND block 206–212 is labeled R0–R3 and indicate the position in the data buffer where incoming data is to be written. The signal labeled WG (write gate) is generated from AND block 214. The input to AND block 214 are generated from Source C Clock on conductor 14 and Source Data Strobe In (S1) on conductor 24. The SRL 202 and SRL 204 are stepped by the Source Data Strobe In on line 24.

FIG. 7B shows a detail block diagram for the sink counter means 40. As with FIG. 7A, the sink counter means 40 includes two SRLs identified by numerals 222 and 224. The outputs from the SRLs are fed over appropriate conductor into AND blocks 226–232. The output from the AND blocks are labeled S0–S3. These outputs indicate the location in the data buffer 34 from which information is to be extracted. AND block 234 combines signals on conductors 20 and 28 and outputs a control signal for driving SRLs 222 and 224, respectively.

Figure 7C:
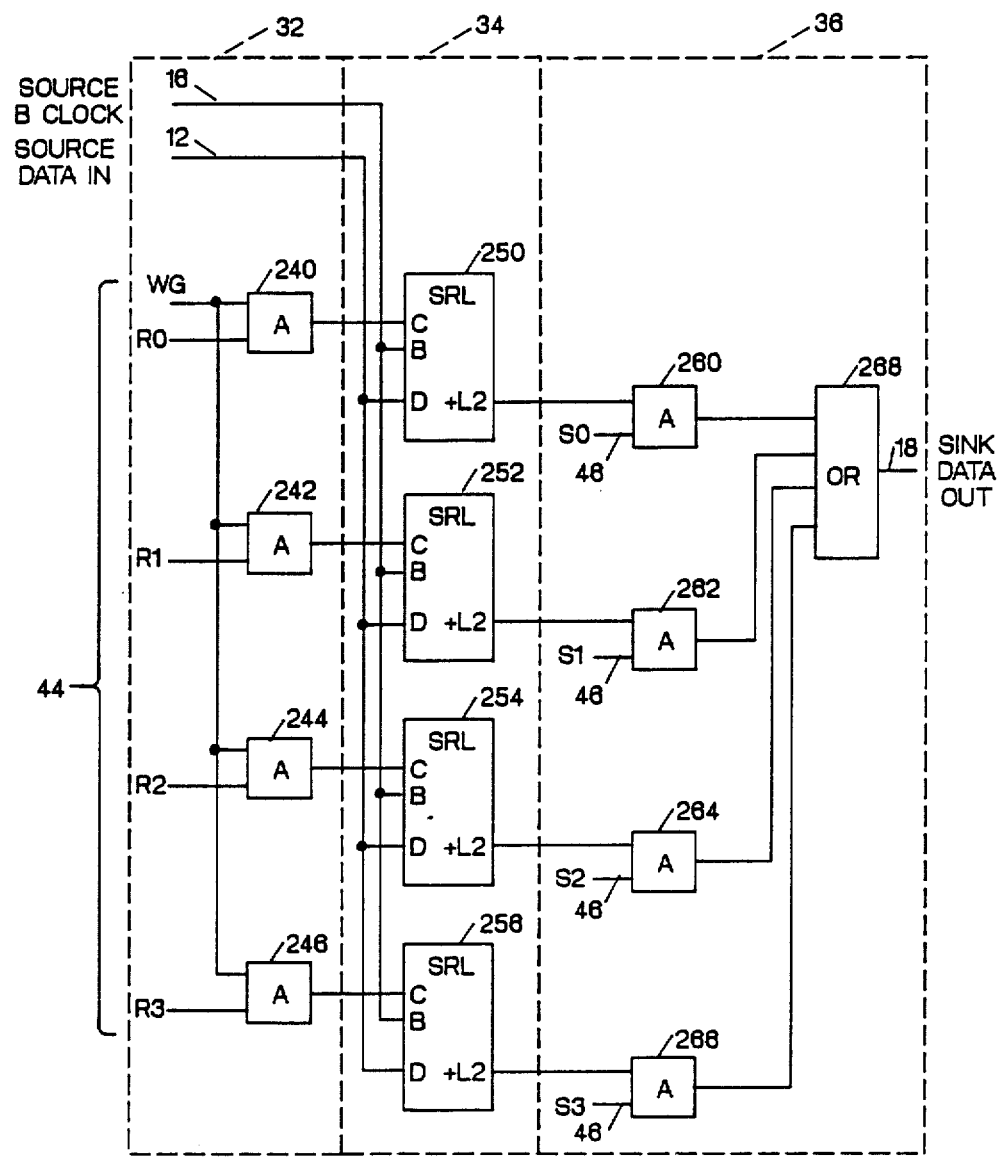

FIG. 7C shows a detail block diagram for write select circuit means 32, data buffer 34 and read select 36. The write select circuit means 32 comprises a plurality of AND circuit blocks identified by numerals 240-246. The input to each AND block includes the previously described WG signals WG and R0 through R3 (FIG. 7A). The data buffer 34 includes SRLs 250-256. Each of the SRLs is connected through appropriate conductors to one of the AND circuits 240-246. Source B Clock signal on conductor 16 and the Source Data In signal on conductor 12 are fed into each of the SRLs. The outputs from the SRLs are fed into AND blocks 260-266. Signals S0-S3 (previously described) are fed into AND blocks 260-266. The outputs from AND blocks 260-266 are fed on appropriate conductors to "OR" circuit means 268. The output from 268 is the Sink Data Out Signal on conductor 18.

Figure 7D:
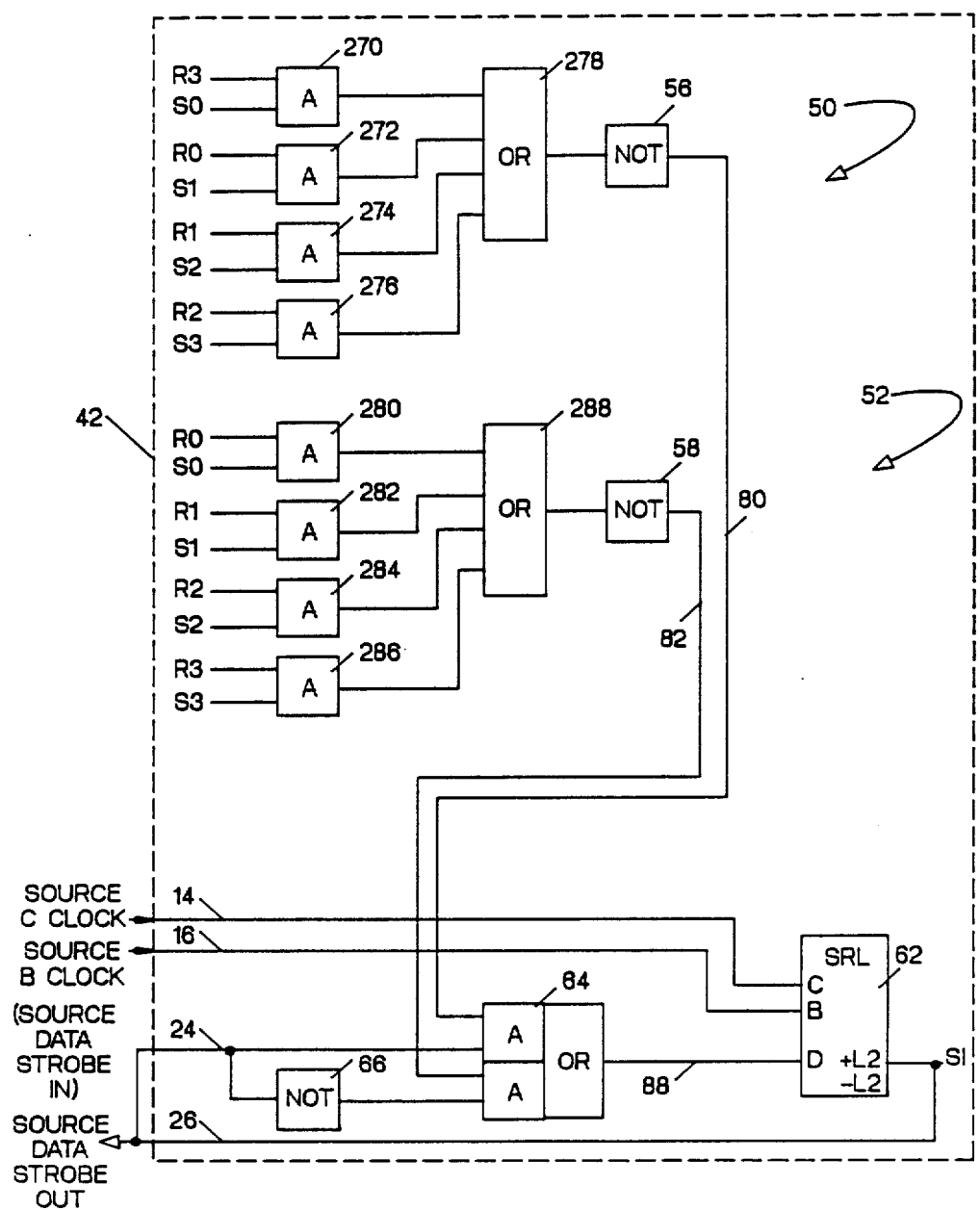

FIG. 7D shows a detail block diagram for Delta Detect with Look-Ahead Circuit Means 42. The compare function "source counter next state=sink counter" is generated in block 50. Block 50 includes AND blocks 270-276, OR block 278 and Not block 56. Similarly, the function "source counter=sink counter" is generated in circuit 52. Circuit 52 includes AND blocks 280-286, OR block 288 and Not block 58. AND/OR block 64 either selects the output on conductor 80 or 82 and synchronizes the selected output signal with Source C Clock and Source B Clock in SRL 62. The output from SRL 62 is the Source Data Strobe Out signal on conductor 26. It should be noted that compare function "source counter=sink counter" is generated for a non-look-ahead compare, and the compare function "source counter next-state=sink counter" is generated for the look-ahead compare.

FIGS. 8A-8D show block diagrams for a source control synchronizer. The figures are helpful in understanding the versatility of the synchronizer. The synchronizer in FIGS. 8A-8D synchronizes and deserializes the synchronized data. That is, the width of each data transfer at the input to the synchronizer is one, but the width of each data transfer at the output of the synchronizer is two.

Figure 8A:
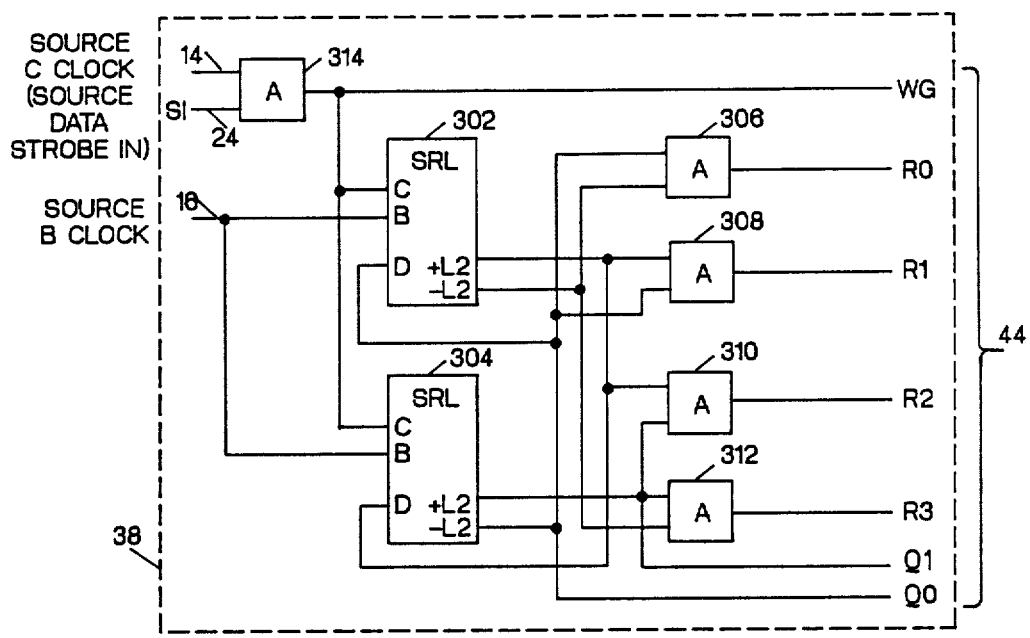
FIGS. 8A-8D show several block diagrams for a source control synchronizer.

FIG. 8A shows a block diagram for source counter 38. The source counter 38 includes SRLs 302 and 304. The SRLs form a 4-state gray code counter. AND gates 306, 308, 310, and 312 decode the four states. AND gate 314 stops the counter when data is not being transferred (that is, when the Source Data Strobe In signal on line 24 is inactive). The AND gates decode output 44. The output is labeled R0, R1, R2, R3, and the write gate output WG. The outputs, that is, R0-R3 and WG, are provided to write select circuitry 32 (FIG. 8C).

Figure 8B:
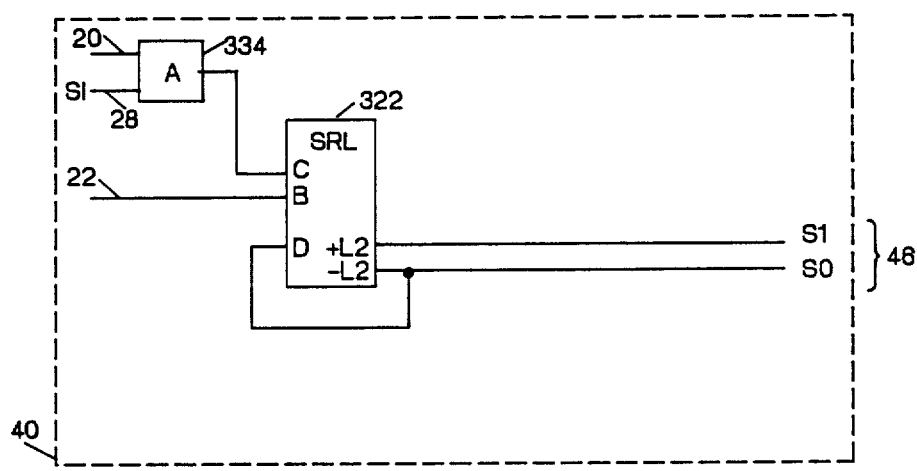

FIG. 8B shows a block diagram of the sink counter 40. Because the synchronizer in FIGS. 8A-8D outputs data whose width is twice as wide as the data input width, half as many data transfers occur on the output side of the synchronizer as occur on the input side. For the same reason, the sink counter has half as many states as the source counter. SRL 322 forms a two-state counter. The two states are labeled S0 and S1, respectively.

Figure 8C:
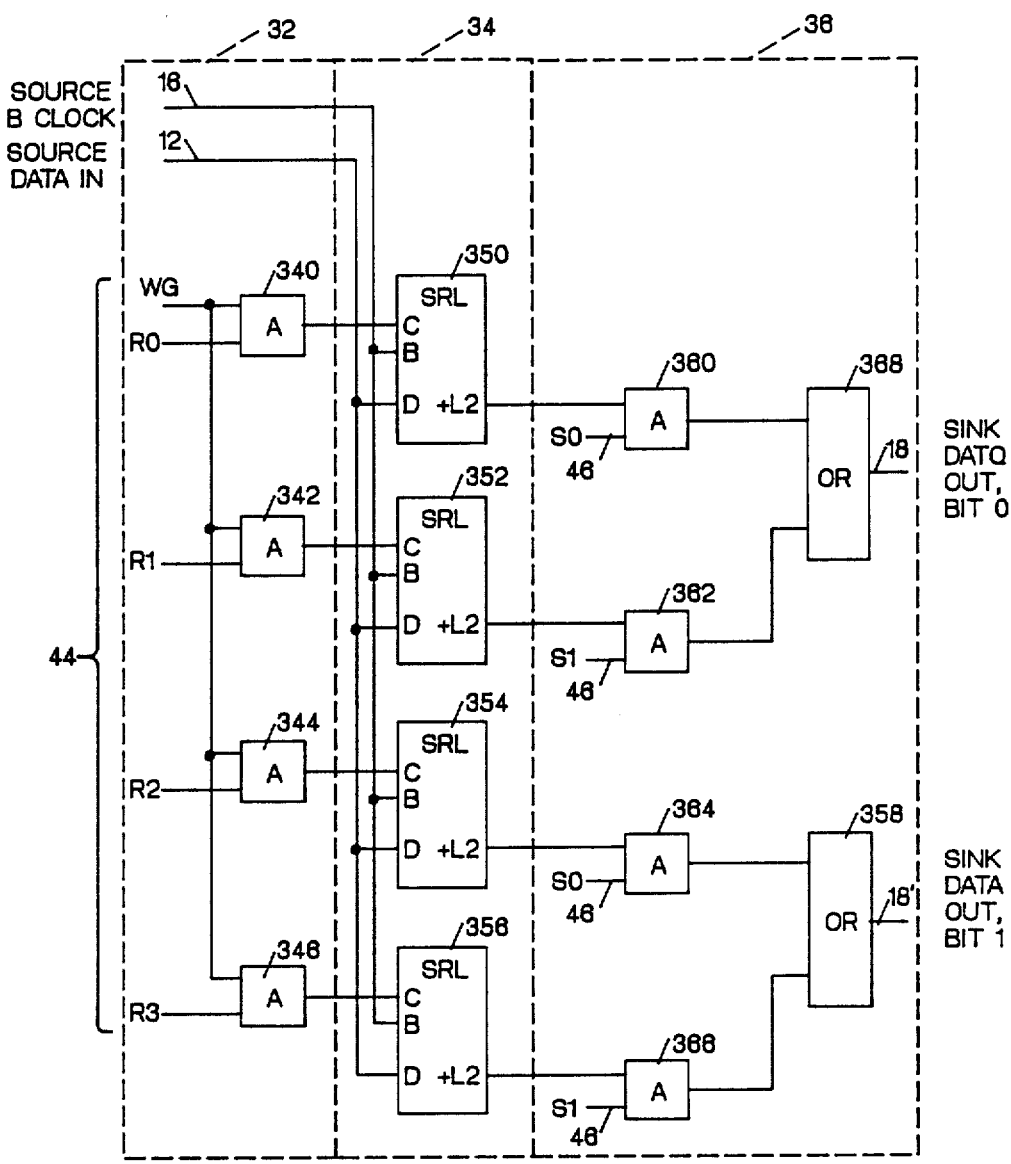

FIG. 8C shows write select circuitry 32, data buffer 34 and read select circuitry 36. The write select circuitry 32 includes AND gates 340-346. The AND gates allow only one bit at a time to be written into the data buffer comprising SRLs 350-356. The read select circuitry 36, including gates 360, 362, 364, 366, 368, and 358, is implemented in such a way that two bits identified as Bit 0 and Bit 1 are simultaneously outputted on conductors 18 and 18'.

Figure 8D:
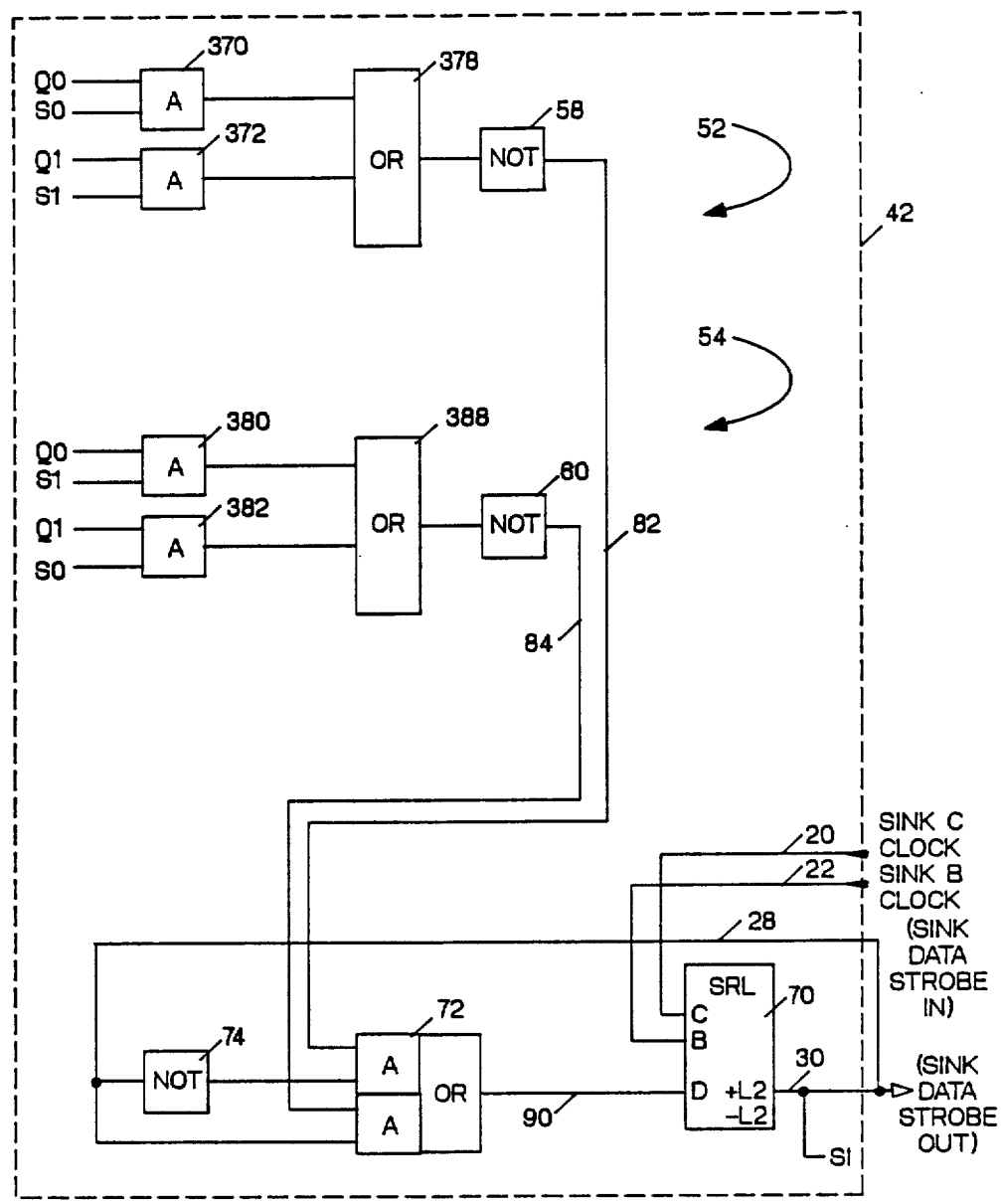

FIG. 8D shows a block diagram for delta detect with look-ahead circuitry 42. The implementation of this function (that is, the delta detect with look-ahead) is substantially similar to that of the synchronizer provided in FIGS. 6A-6D. However, there are some differences due to the deserialization that occurs in the synchronizer. The purpose of the delta detect is to determine when data can be transferred. In the case of a source control synchronizer, the delta detect determines when a good new data item exists in the buffer to be transfer to the sink system. In the synchronizer presented in FIGS. 8A-8D a data item on the output side consists of two bits. That is, two bits at a time are transferred from the synchronizer to the sink system. Therefore, the delta detect has been designed to detect when two good bits exist in the buffer. In order for this compare to be performed, only the most significant bit of the source counter is compared with the sink counter. When the positive output of SRL 304 (FIG. 8A) changes from inactive to active, then this indicate that data has been written into the first two buffer position in FIG. 8C (SRLs 350 and 352). Likewise, when the output of SRL 304 changes from active to inactive (negated by the line marked "Q1" going active), then this indicates that data has been written into the last two buffer position in FIG. 8C (SRLs 354 and 356). Therefore, the delta detect FIG. 8D compares lines Q0 and Q1 to the sink counters output marked S0 and S1 in order to determine when data should be transfer. The signal indicating when data is to be transfer is labeled Sink Data Strobe Out on conductor 30.

FIGS. 9A-9I show a source and sink control synchronizer. It is designed to be used as an elastic buffer. This synchronizer features single bit transfers on both the input and output. Because data is to be transferred into the synchronizer on every source system clock cycle and data is to be transferred out of the synchronizer on every sink system clock cycle, no Data Strobe In signals are used. The data buffer has 16 buffer positions, each being capable of holding a single bit. Both the source and sink counters have 16 states.

Figure 9A:
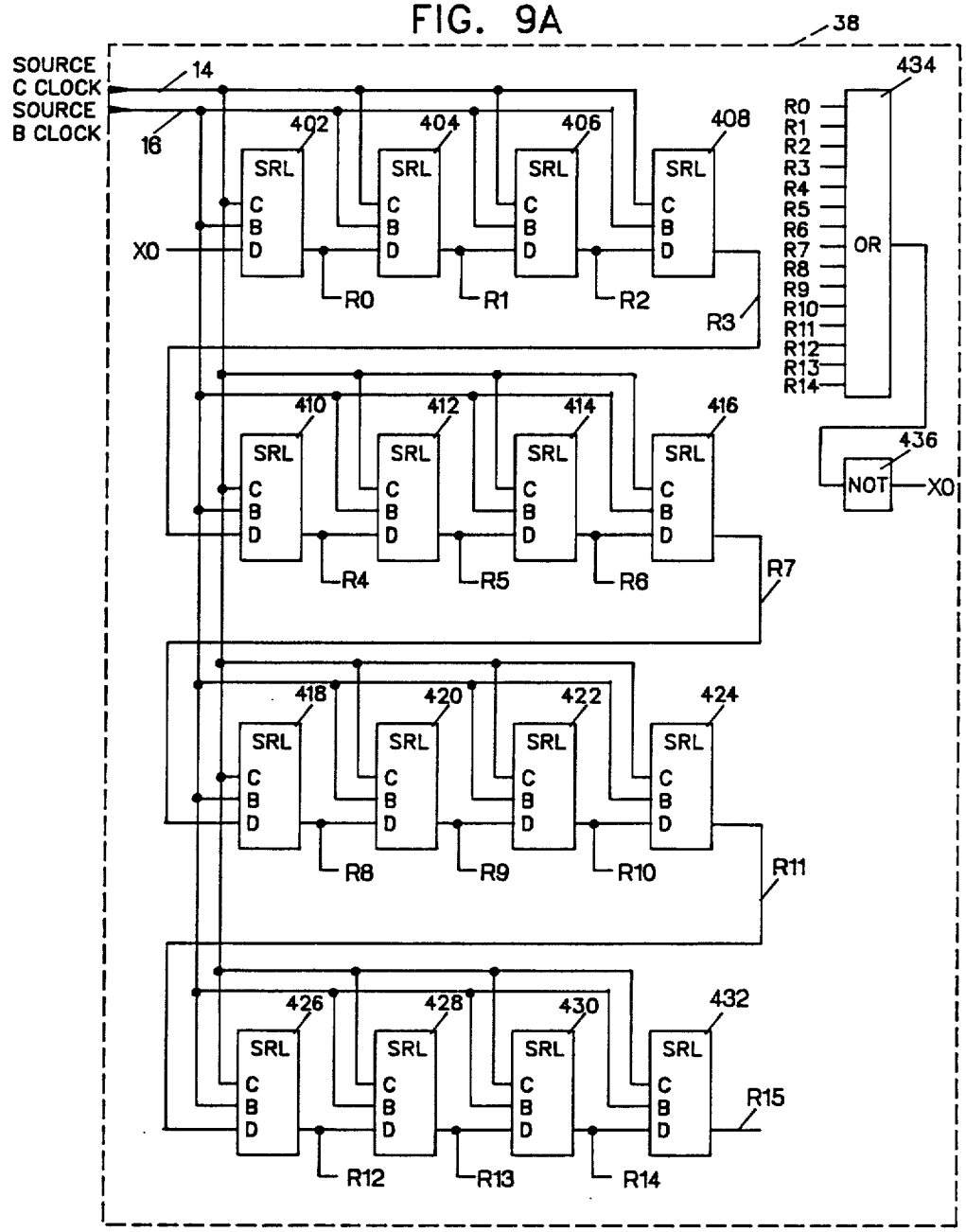
FIGS. 9A-9I show several block diagrams for a source and sink control synchronizer. The synchronizer is designed to be used as an elastic buffer.
Figure 9B:
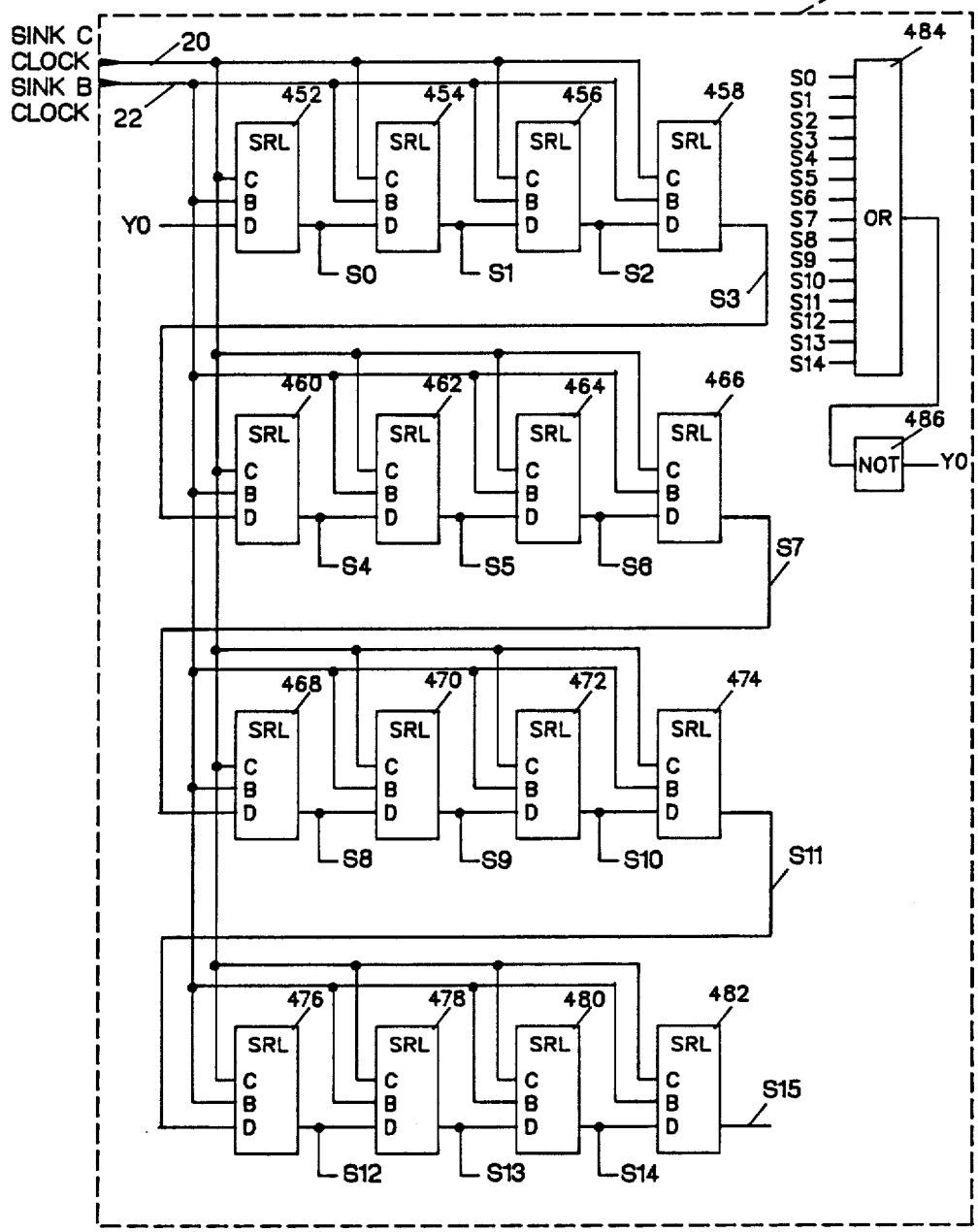

FIG. 9A shows a block diagram for the source counter 38. The sink counter 40 is shown in FIG. 9B. Since they are both implemented identically, the operation of both can be understood by examining the source counter alone in FIG. 9A. Source counter 38 is implemented as a ring counter. Sixteen latches, SRLs 402-432, form the ring counter. The counter is implemented so that one and only one SRL output is activated at any one time. Also, the SRLs go active in sequence. For example, if the state of SRL 402 is a 1 on a given clock cycle, then on the next clock cycle the state of SRL 402 will become a 0 and the state of SRL 404 will become a 1. The purpose of gates 434 and 436 is to ensure that only valid states are represented in the ring counter. For example, if due to some glitches in the power supply the state of two SRLs simultaneously becomes 1, then gates 434 and 436 ensure that the ring counter returns to a valid state within a finite amount of time. Because of the nature of the ring counter, no decoding of the output of the source and sink counter is required.

Figure 9C:
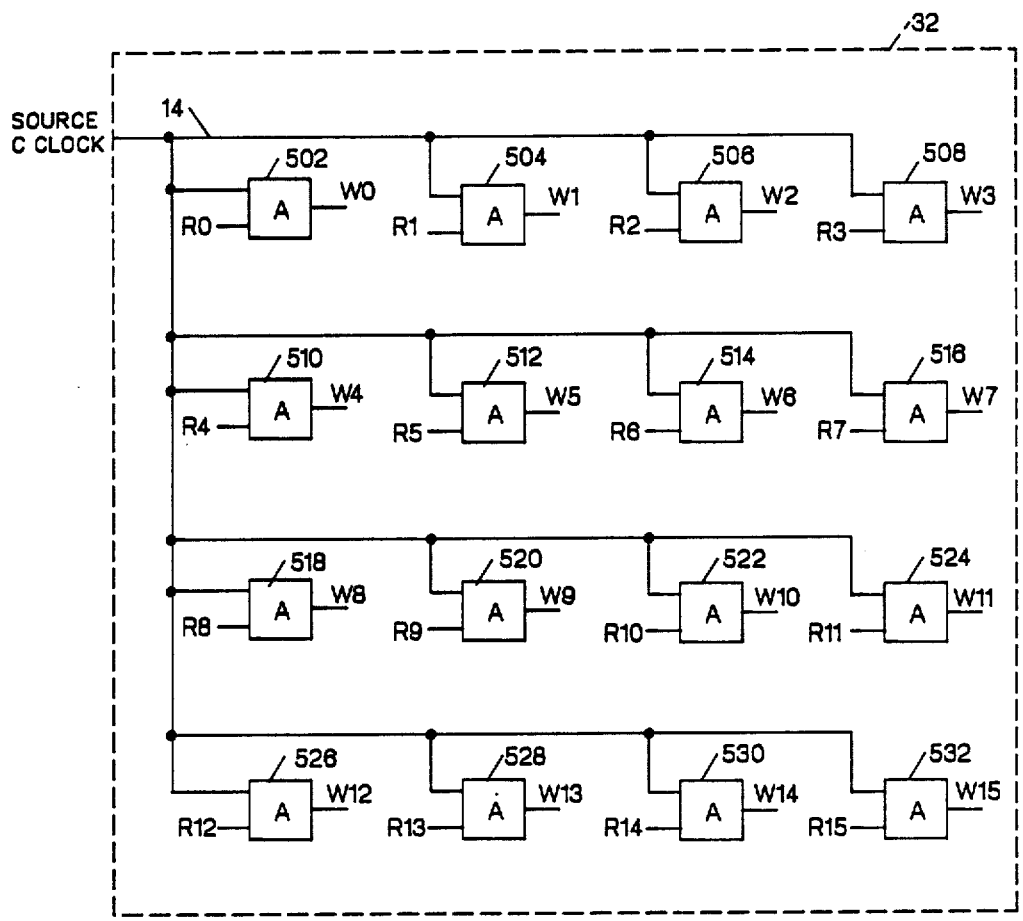
Figure 9D:
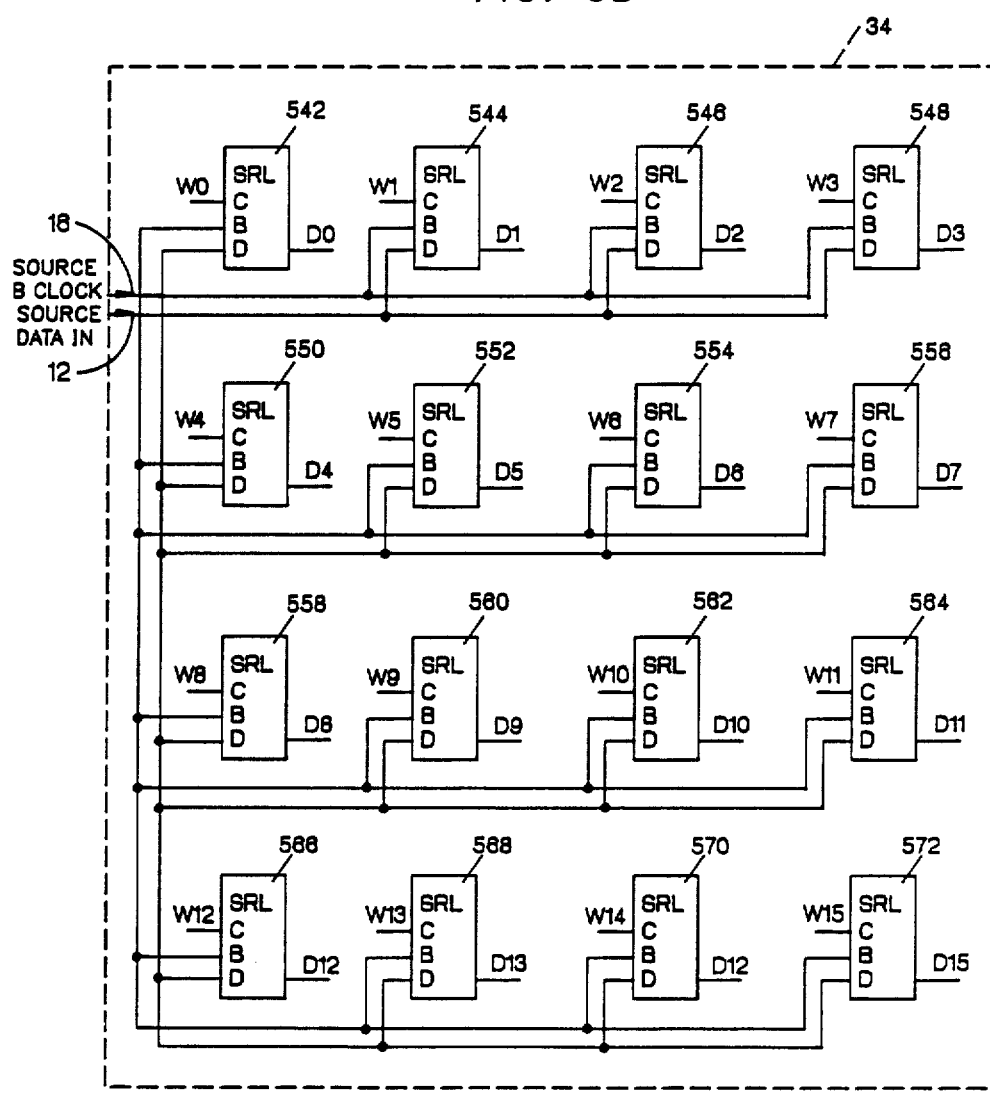
Figure 9E:
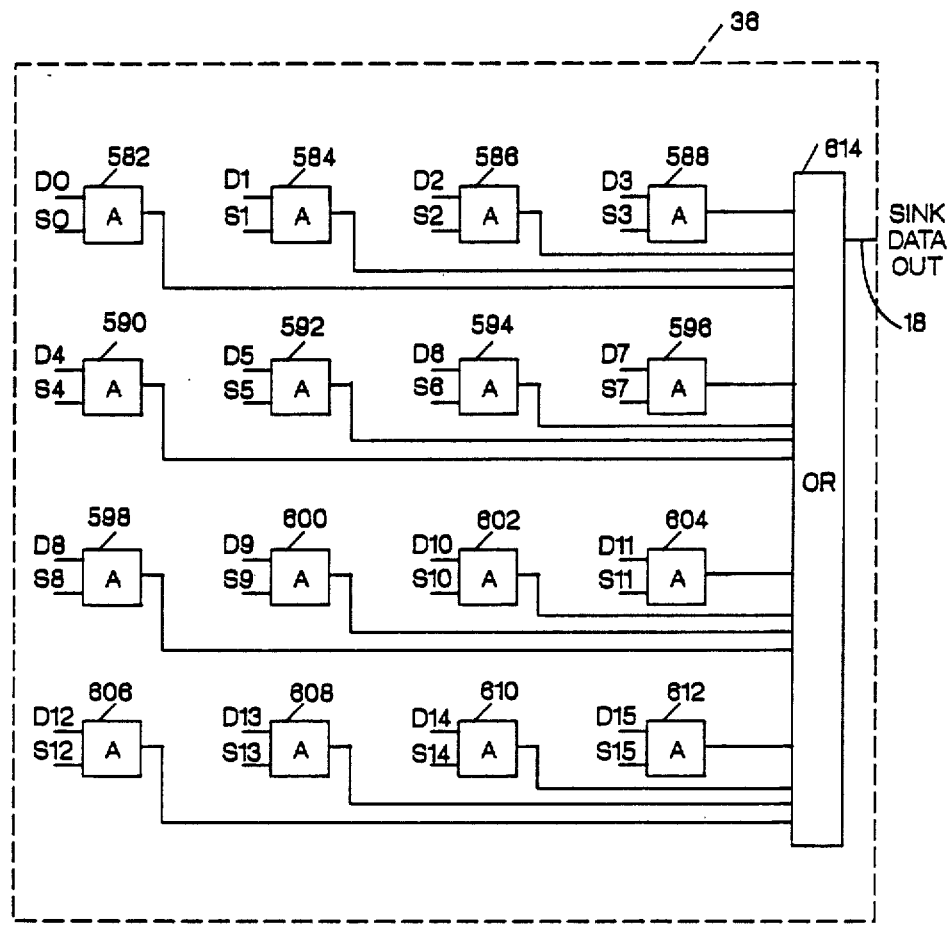

The write select circuitry 32 is shown in FIG. 9C and the data buffer 34 is shown in FIG. 9D. Note that each source system clock cycle a data bit is written into a data buffer position. Likewise, the read select circuitry 36, which is shown in FIG. 9E, causes a single bit to be read out of the data buffer 34 each sink system clock cycle.

Figure 9F:
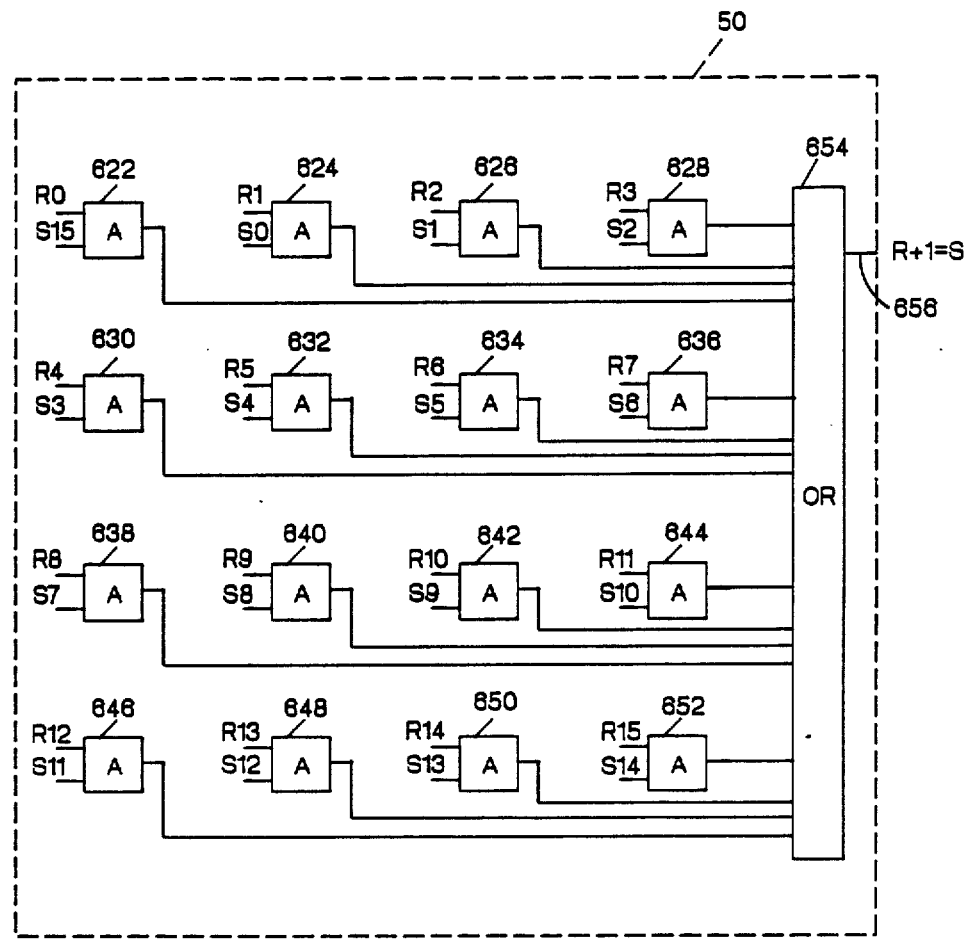
Figure 9G:
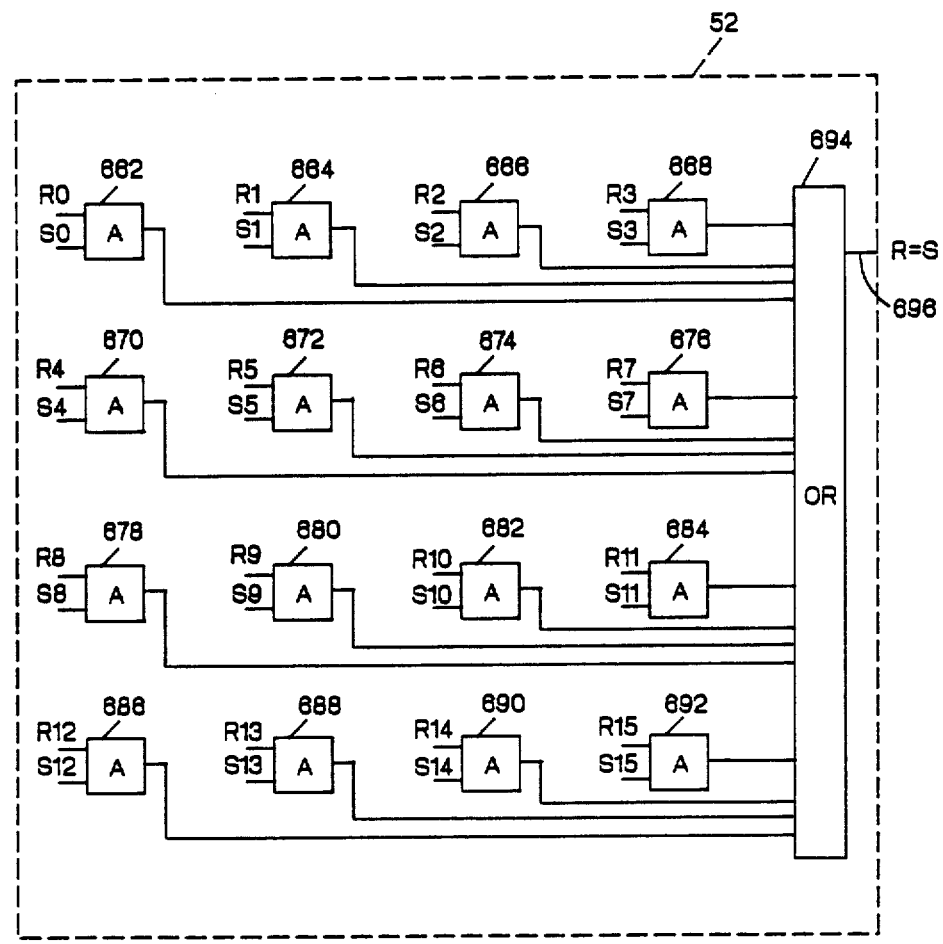
Figure 9H:
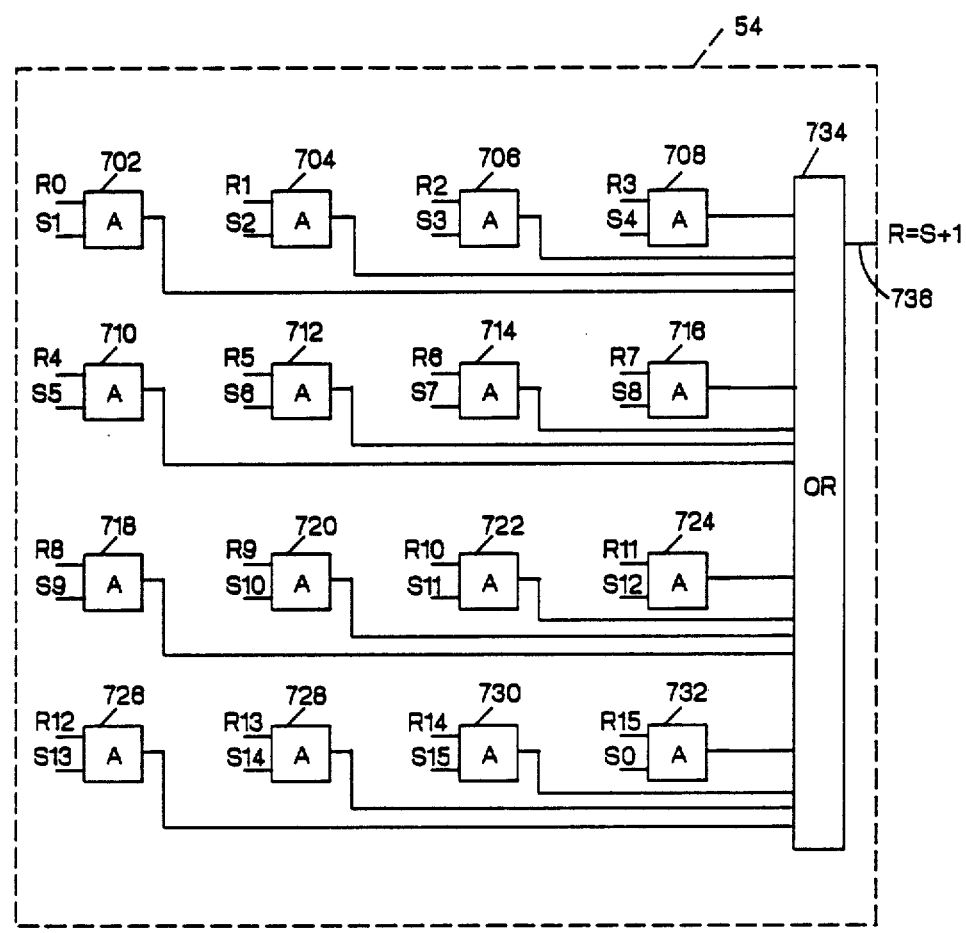
Figure 9I:
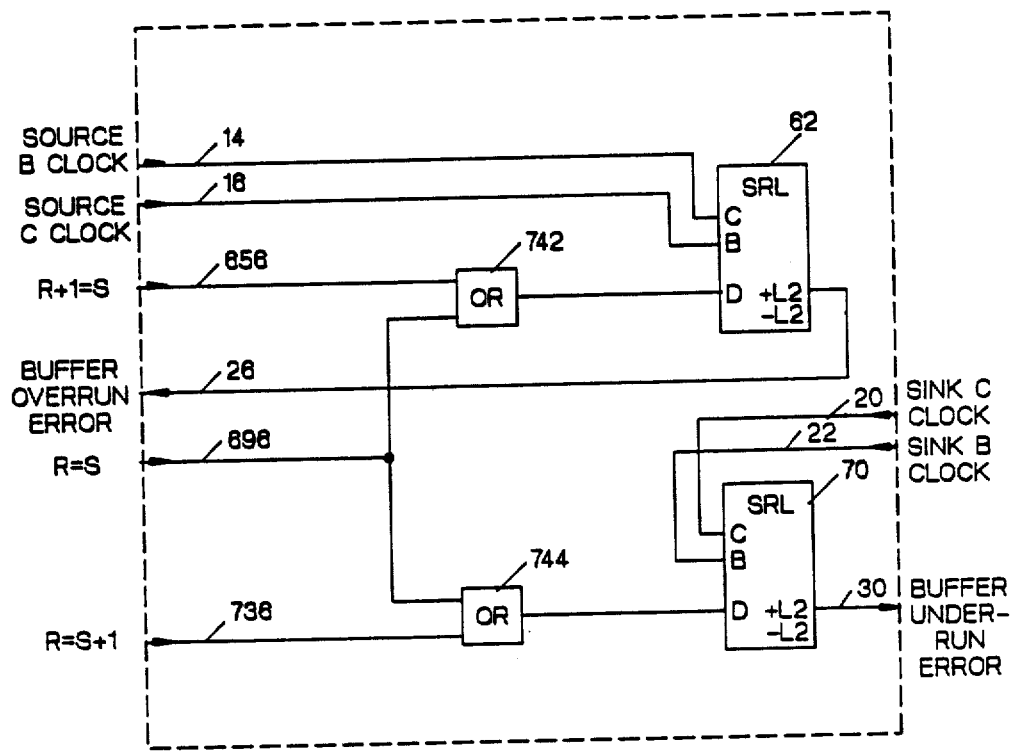

The delta detect with look-ahead is shown in FIGS. 9F, 9G, 9H and 9I. Note that the purpose of the delta detect in this type of synchronizer is not to control data flow, but to indicate when a data error has occurred. Shown in FIG. 9F is the circuitry which generates the function "source counter next-state=sink counter." The circuitry which generates the function "source counter=sink counter" is shown in FIG. 9G, and the circuitry which generates the function "source counter=sink counter next-state" is shown in FIG. 9H. These three compare function outputs feed into the circuitry in FIG. 9I, where error detection occurs. Because there are no data strobe input signals for this synchronizer, the look-ahead compares are used a little differently than in the other synchronizers which have been presented. The look-ahead compares are used to provide additional assurance of error detection (that is, to insure that no error condition is missed), and to distinguish between overrun and underrun conditions in the synchronizer. This function actually indicates that an error is imminent, before data is actually lost.

The functions "source counter next-state=sink counter" (marked 656) and "source counter=sink counter" 696 are ORed together in gate 742. The output of gate 742 is then fed into SRL 62 in order to synchronize this signal to the source system clocking. The output of SRL 62 forms the buffer overrun error signal. The buffer overrun error signal is somewhat equivalent to the Source Data Strobe Out signal present in the other synchronizers, except that the buffer overrun error signal has the opposite polarity of the strobe out signal. Note then, that if at a source system clock time, the source counter next-state is equal to the sink counter state, then a buffer overrun error is indicated. That is, if the source counter is about to write the last available buffer position, then an error is indicated, because the next write will cause the loss of data. The generation of the buffer underrun error signal is similar to the generation of the overrun signal. Functions "source counter=sink counter" and "source counter=sink counter next-state" are ORed in gate 744, and gate 744 output is driven to SRL 70 for synchronization to the sink system clocking. In this case, when the sink counter reads the last buffer position containing good data, buffer underrun error condition occurs.

Normally, reset circuitry is provided in the elastic buffer so that at power on time, the circuit can be properly initialized. Also, if the elastic buffer has reset capability, the buffer over and underrun error indications which are generated in the circuitry in FIG. 9I can be fed back to the elastic buffer in order to reset it. However, in order to keep the presentation of the elastic buffer as clear as possible, the additional circuitry required to reset this synchronizer is not shown. Normally, this type of synchronizer, when reset, is forced into a state such that the data buffer is "half-full." Therefore, during operation the elastic buffer can both "expand" or "contract," as far as data buffering is concerned. In order to accomplish this type of reset, it is only necessary to force at reset time the source counter to state R0, and the sink counter to state S8. In addition, if desired, the data buffer itself can be forced to a known state. The additional circuitry required in order to provide reset capability is as follows, depending on what method is chosen: dual ported SRLs can be used instead of the single ported type shown, and the second port can be used to force the reset condition. A dual ported SRL contains two C clock inputs, and two data inputs. Each data input is associated with one of the C clocks. Data from any one of the data inputs can be forced into the SRL by activating the appropriate associated C clock.

A second method of implementing the reset is to use gates to force the SRLs to the desired state at reset time. AND gates can be placed on the data inputs to the SRLs which must be forced to a "zero" during a reset, and OR gates can be placed on the data inputs to the SRLs which must be forced to a "one" during a reset. At reset time, the appropriate control signals are applied to these gates in order to force the reset state.

This completes the detailed description of the present invention.

While the invention has been particularly shown and described with reference to the preferred embodiments thereof, it will be understood by those skilled in the art that various changes in form and details may be made therein without departing from the spirit and scope of the invention.

We claim:

1. A circuit arrangement for receiving data at a rate determined by a first clock and synchronizing the data at a rate determined by a second clock where the clocks are not generated from a common source comprising:
   storage means having a plurality of storage locations with each location receiving and storing a unit of data;
   a write select circuit means responsive to a first enabling signal for writing data into said storage means;
   a read select circuit means responsive to a second enabling signal for extracting data from said storage means;
   a first counting means coupled to said write select circuit means and when activated by the first clock to indicate a location in the storage means whereat the data is to be written;
   a second counting means coupled to said read select circuit means and when activated by the second clock indicate a storage location from which data is to be read; and
   a third means for comparing selected states within the first and second counting means and to generate one or more control signals representing the state of said storage means.

2. The circuit arrangement of claim 1 wherein the write select circuit means includes a plurality of logical AND gates with each gate generating a bit.

3. The circuit arrangement of claim 1 wherein the storage means includes a plurality of shift register latches.

4. The circuit arrangement of claim 1 wherein the read select circuit means includes
   a logical OR gate having a single output and a plurality of inputs; and
   a plurality of AND gates one of each being coupled to an input of the OR gate.

5. The circuit arrangement of claim 1 wherein the first counting means includes
   at least two shift register latches;
   a plurality of AND gates one of each being coupled to an output of the shift register latches for decoding a state in said latches; and means for stepping the shift register latches through the respective states.

6. The circuit arrangement of claim 1 wherein the second counting means includes
at least two shift register latches said latches being configured into a multi-state gray code counter;
a plurality of AND gates one of each coupled to an output of the multi-state gray code counter for decoding a state in said counter; and
means or stepping the counter through its respective stages.

7. The circuit arrangement of claim 1 wherein the third means includes
a compare means for comparing states of the first and second counting means respectively;
a Source Data Strobe out control means responsive to signals outputted from the compare means for generating and outputting a first control signal; and
a Sink Data Strobe out control means responsive to electrical signals outputted from the compare means for generating and outputting a second control signal with said first and second control signal indicating the presence and/or absence of data in said storage means.

8. The circuit arrangement set forth in claim 7 further including two pairs of externally generated enabling signals with one pair of said signals enabling the Source Data Strobe Out control means and another pair of said signals enabling the Sink Data Strobe out control means.

9. The circuit arrangement set forth in claim 1 wherein the selected states include the first and second counting means being at a common counting state A or B and one of the counting means being at state $A+1$ and the other counting means being at state $(B+1)$, where A and B represent respective counting state within each of the counting means.

10. The circuit arrangement set forth in claim 1 wherein the third means includes a first compare means for comparing a common counting state $A=B$ in said first and second counting means and a second compare means coupled with the first compare means and for comparing the B counting state in one of the counting means with an $(A+1)$ counting state in the other counting means, where A and B represent respective counting state within each of the counting means.

11. The circuit arrangement set forth in claim 10 further including a first circuit means coupled to the first and second compare means and for selecting and outputting a control signal representative of an output signal from one of said first and second compare means; and a D-type SRL connected to said first circuit means for synchronizing said control signal with the second clock.

12. A device for synchronizing data from a source system with clocks from a sink system comprising:
a storage means having a plurality of storage locations therein with each storage location storing a data item;
a write select circuit means for writing data into said storage means;
a read select circuit means for selectively reading out data;
a first counting means coupled to said write select circuit means for indicating locations within said storage means whereat data is to be written; and
a second counting means coupled to the read select circuit means for indicating storage locations from which the data is to be read; and
a third means being responsive to electrical signals outputted from common and different states in the first and second counting means and for generating error signals representative of error conditions within said device.

13. The device set forth in claim 12 wherein the error signals indicate a buffer overrun and/or underrun condition.

* * * * *